(12) United States Patent
Schilders

(10) Patent No.: US 12,511,274 B2
(45) Date of Patent: Dec. 30, 2025

(54) INDEXING IN GRAPH-BASED MODELS

(71) Applicants: INFOSYS LIMITED, Bangalore (IN); INVERTIT INC., Columbus, IN (US)

(72) Inventor: Steven Schilders, Columbus, IN (US)

(73) Assignees: Infosys Limited, Bangalore (IN); InvertIT Inc., Columbus, IN (US)

( * ) Notice: Subject to any disclaimer, the term of this patent is extended or adjusted under 35 U.S.C. 154(b) by 0 days.

(21) Appl. No.: 18/443,276

(22) Filed: Feb. 15, 2024

(65) Prior Publication Data
US 2024/0289315 A1 Aug. 29, 2024

Related U.S. Application Data

(60) Provisional application No. 63/448,762, filed on Feb. 28, 2023, provisional application No. 63/448,738, filed on Feb. 28, 2023, provisional application No. 63/448,831, filed on Feb. 28, 2023.

(51) Int. Cl.
*G06F 16/22* (2019.01)
(52) U.S. Cl.
CPC ................ *G06F 16/2264* (2019.01)
(58) Field of Classification Search
CPC ....... G06F 16/2264; G06F 16/83; G06F 16/93
See application file for complete search history.

(56) References Cited

U.S. PATENT DOCUMENTS

| | | | |
|---|---|---|---|
| 6,334,125 B1* | 12/2001 | Johnson | G06F 16/24561 707/999.005 |
| 2020/0026736 A1* | 1/2020 | Reddy | G06F 16/93 |
| 2024/0134866 A1* | 4/2024 | Siddharth | G06Q 50/01 |

* cited by examiner

*Primary Examiner* — Robert W Beausoliel, Jr.
*Assistant Examiner* — Nirav K Khakhar
(74) *Attorney, Agent, or Firm* — Finnegan, Henderson, Farabow, Garrett & Dunner, LLP

(57) ABSTRACT

An overlay system is provided that includes a storage element and processing circuitry. The storage element stores an executable graph-based model that includes node templates, node instances, and index nodes. Each node template is associated with one or more node instances and one or more index nodes. Further, each index node includes index records. The processing circuitry receives a contextualized stimulus associated with the overlay system and identifies one or more index records that include an index value indicated by the contextualized stimulus. Based on the identified one or more index records, the processing circuitry further identifies one or more node instances required for stimulus processing. Further, the processing circuitry executes an operation associated with the stimulus based on the identified one or more node instances and each node template associated with the identified one or more node instances.

20 Claims, 18 Drawing Sheets

INDEXING IN GRAPH-BASED MODELS

CROSS-REFERENCE TO RELATED APPLICATIONS/INCORPORATION BY REFERENCE

This patent application refers to, claims priority to, and claims the benefit of U.S. Provisional Application Ser. No. 63/448,762 filed Feb. 28, 2023; 63/448,738, filed Feb. 28, 2023, and 63/448,831, filed Feb. 28, 2023, the contents of which are hereby incorporated herein by reference in its entirety.

FIELD OF THE DISCLOSURE

Various embodiments of the present disclosure relate generally to graph-based models. More specifically, various embodiments of the present disclosure relate to indexing in executable graph-based models.

BACKGROUND

Advancements in the field of science and engineering have enabled exploration of various domains such as robotics, artificial intelligence, machine learning, or the like, to facilitate digitization and automation of systems associated with various applications (such as healthcare, finance, warehouse, or the like). Storing of data associated with a system in a storage element and utilization of the stored data is crucial for digitization and automation of the corresponding system. Primary requirement for utilization of the stored data is identification of required data in the storage element. Traditionally, the identification of the required data occurs by traversing through the entire stored dataset of the storage element. Such an identification leads to an increased latency.

In light of the foregoing, there exists a need for a technical and reliable solution that overcomes the abovementioned problems.

Limitations and disadvantages of conventional and traditional approaches will become apparent to one of skill in the art, through the comparison of described systems with some aspects of the present disclosure, as set forth in the remainder of the present application and with reference to the drawings.

SUMMARY

Methods and systems for facilitating indexing in executable graph-based models are provided substantially as shown in, and described in connection with, at least one of the figures.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

Embodiments of the present disclosure are illustrated by way of example and are not limited by the accompanying figures. Similar references in the figures may indicate similar elements. Elements in the figures are illustrated for simplicity and clarity and have not necessarily been drawn to scale.

DETAILED DESCRIPTION

Figure 1:
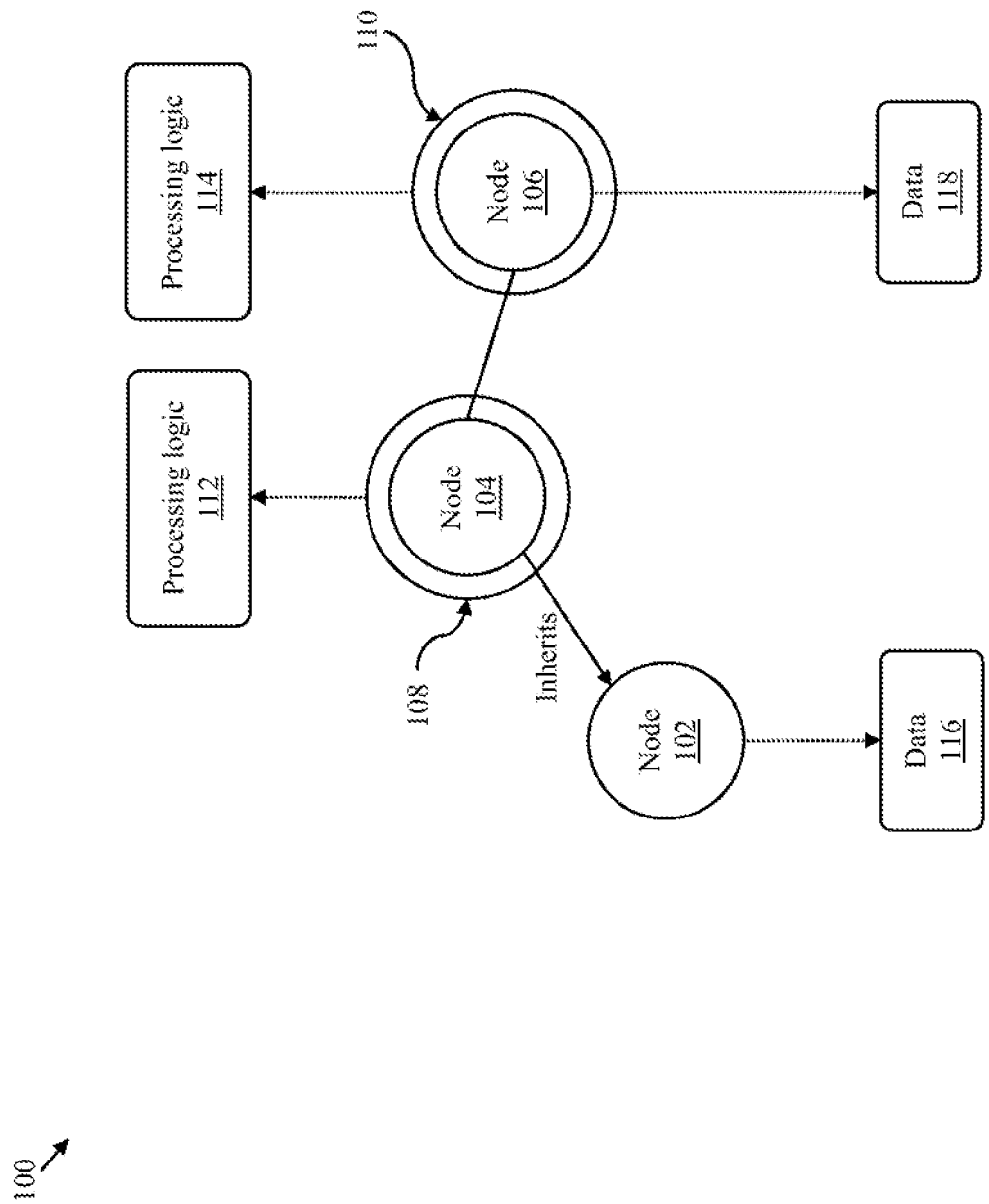
FIG. 1 is a graph that illustrates a composition of an executable graph-based model, in accordance with an embodiment of the present disclosure.

The detailed description of the appended drawings is intended as a description of the embodiments of the present disclosure and is not intended to represent the only form in which the present disclosure may be practiced. It is to be understood that the same or equivalent functions may be accomplished by different embodiments that are intended to be encompassed within the spirit and scope of the present disclosure.

Overview

Data storage and retrieval of the stored data is crucial for digitization and automation of systems associated with various domains such as healthcare, finance, warehouse, or the like. Conventionally, the stored data is indexed to reduce latency associated with identification and retrieval of required data. Indexing refers to a technique that involves generation and maintenance of index records for the stored data. An index record for a data element of the stored data refers to a data structure that includes the data element and an identifier associated therewith. The identifier is unique to the data element and facilitates identification of the data element in the stored data. An index file associated with the stored data includes an index record for each data element of the stored data. Notably, while looking for a desired data element, traversal of the index file requires less time than traversal of the stored data in its entirety.

Traditionally, a single index file associated with a data storage/organization system includes index records for all the data associated with the data storage/organization system. Thus, such an index file includes a large number of index records and retrieval of an index record for desired data requires searching through the large number of index records of the index file. Hence, such retrieval of the index record for accessing the desired data involves significant latency. Additionally, the index file may include index records associated with sensitive data (e.g., protected health information, personally identifiable information, financial information, or the like) in the data storage/organization system. Hence, the index records associated with the sensitive data become accessible to anyone who accesses the index file, thereby leaving the sensitive data vulnerable and prone to security attacks such as identity theft, data misuse, or the like. Moreover, the index file is stored separately from the data that is indexed, as the index file and the data that is indexed are stored in different storage files associated with the data storage/organization system. This implies that an index record of desired data is retrieved from the index file and the desired data is identified in another storage file based on the retrieved index record. As the index and the desired data are stored in separate files, latency gets induced in a data retrieval operation during the identification of the desired data based on the retrieved index record. The latency is proportional to the size of the index file (e.g., the number of indexed records). Further, the latency is a function of a searching algorithm used to identify the index and the duration associated with the retrieval of data that is indexed.

The present disclosure is directed to the facilitation of indexing in executable graph-based models. The executable graph-based models are stored in a storage element of an overlay system. The executable graph-based models are customized hypergraphs having hyper-edges that include one or more roles and vertices that are realized by way of executable nodes. Each executable node is a base node having a particular node type. For example, an edge node corresponds to a base node with an edge node type. Further, each executable node is extended by way of one or more overlays. Nodes (for example, base nodes and executable nodes) are connected with other nodes by way of edge nodes (e.g., roles included in the edge nodes) therebetween. In some embodiments, roles are represented by way of nodes of role node type. Role node between two nodes may be indicative of details regarding an association therebetween. Further, each node (e.g., a base node, an executable node, and an overlay node) includes a node template and a node instance. A node template is a predefined node structure, whereas a node instance is an implementation of the corresponding node template. The executable graph-based model further includes multiple index nodes. Each node template is associated with one or more index nodes, with the one or more index nodes configured to facilitate generation of index records for each node instance associated with the node template.

In an example, the executable graph-based model may include multiple node templates, and one or more node instances and one or more index nodes associated with each node template. Each index node includes multiple index records, with each index record being associated with a node instance of the associated node template. Further, each index record includes an identifier of the corresponding node instance and an index value that is derived from node instance values of the corresponding node instance. Each node template of the executable graph-based model may be used to implement an operational facet of the executable graph-based model. Also, each operational facet of the executable graph-based model may be associated with one or more entities. Therefore, an index node associated with a node template may only be accessible to the set of entities associated with the operational facet implemented by the node template. In operation, processing circuitry of the overlay system may receive a stimulus with a context that is indicative of a reference index value of desired data. Based on the context of the stimulus, the processing circuitry identifies, in the executable graph-based model, one or more index nodes that include index records of one or more node templates that implement an operational facet that is associated with the desired data. Subsequently, only those index nodes that store data associated with the stimulus are traversed to identify one or more index records associated with the desired data and include the reference index value. The identified index records include the identifiers of the associated node instances. The processing circuitry thus identifies, in the executable graph-based model, one or more node instances that have the identifiers associated with the identified index records. Further, the processing circuitry executes an operation associated with the stimulus based on the identified one or more node instances and each template associated with the identified one or more node instances.

Traditional approach of utilizing index records involves searching for an index that is stored in an index file, that is separate from another storage file storing the required data, to identify identifiers assigned to the required data, retrieving the identifiers from the index file, and identifying the required data stored in the other storage file by utilizing the retrieved identifiers. As the index file and the other storage file are stored separately on the storage device, there is significant latency involved in the identification of the required data. Additionally, as the entire index file is accessible to all the entities that have access to the system, confidential data is at risk. On the contrary, the disclosed approach includes index records in the executable graph-based model. Additionally, only the index nodes associated with a node template indicated in the context of the stimulus are searched to retrieve the identifiers. Such index nodes are exclusive to the node template and have significantly fewer entries of index records. Additionally, the index nodes and the required data nodes are stored in the same executable graph-based model. Hence, the latency involved with the identification of the required data is significantly reduced. Additionally, as only the entities associated with a corresponding operational facet of the system (such as the executable graph-based model) have access to the associated index nodes, any confidential data present in the system is secure. The system can be further secured through the application of one or more security and access policy overlays to index nodes. Thus, the systems and methods disclosed herein provide an efficient and secure approach for indexing in the executable graph-based models in a seamless manner.

Systems and methods for facilitating indexing in executable graph-based models are provided. The systems and methods disclosed herein facilitate indexing at the node level that allows the required identifiers to be retrieved from within the executable graph-based model. Additionally, the disclosed systems and methods provide secured indexing as only the entities associated with an operational facet of the executable graph-based model have access to index nodes associated with the operational facet. Thus, confidential data remains uncompromised. Hence, the disclosed systems and methods provide an approach for indexing in the executable graph-based models that is highly secure and exhibits significantly reduced latency during the data retrieval. As a result, the time complexity associated with the data retrieval is reduced. The reduction in time complexity and the security associated with the data retrieval are beneficial in applications such as healthcare, finance, warehouse, or the like, that involve crucial operations based on the data retrieval. Further, the systems and methods disclosed herein allow for dynamic scale-up and scale-down of index records without having to make significant changes. Further, the disclosed systems and methods do not require the data and processing logic to be available at all times, and hence, the data and processing logic when not in use may be stored separately and re-loaded in the corresponding executable node when needed. Thus, the systems and methods disclosed herein provide an efficient approach for indexing in the executable graph-based models in a secured and seamless manner.

FIGURE DESCRIPTION

FIG. 1 is a graph that illustrates a composition of an executable graph-based model 100, in accordance with an embodiment of the present disclosure. Referring to FIG. 1, the executable graph-based model 100 is generally formed of a data structure (e.g., a graph-based model or a graphical model) comprising a plurality of nodes 102-106 which can be functionally extended with processing logic via the use of overlays. For example, as shown in FIG. 1, the nodes 104 and 106 are functionally extended with processing logic via the use of overlays 108 and 110, respectively. Although not shown, it will be apparent to a person skilled in the art that the node 102 can be similarly extended with processing logic via the use of one or more overlays. Each overlay includes processing logic, such as processing logic 112 and processing logic 114 which are associated with the overlays 108 and 110, respectively. At run-time, data, such as data 116 and 118, is associated with the nodes 102 and 106, respectively, of the executable graph-based model 100, and the overlays 108 and 110 of the nodes 104 and 106, respectively, provide the functionality to respond to stimuli and interact with, manipulate, or otherwise process the data for message generation and message handling based on stimuli. Further, the node 104 inherits the node 102 and hence also inherits the data 116 which is associated with the node 102. In some embodiments, the node 102 may be extended to have one or more overlays. In such embodiments, the node 104 may further inherit the overlays of the node 102.

Each element within the executable graph-based model 100 (both the data and the processing functionality) is a node. A node forms the fundamental building block of all executable graph-based models. A node may be an executable node. A node extended by way of an overlay node forms an executable node. One or more nodes are extended to include overlays in order to form the executable graph-based models. As such, the executable graph-based model 100 includes one or more nodes that can be dynamically generated, extended, or processed by one or more other modules within an overlay system (shown in FIG. 2).

As such, the structure and functionality of the data processing are separate from the data itself when offline (or at rest) and are combined dynamically at run-time. The executable graph-based model 100 thus maintains the separability of the data and the processing logic when offline. Moreover, by integrating the data and the processing logic within a single model, processing delays or latencies are reduced because the data and the processing logic exist within the same logical system. Therefore, the executable graph-based model 100 is applicable to a range of time-critical systems where efficient processing of the stimuli is required. In an instance, the executable graph-based model 100 may be indexed.

Figure 2:
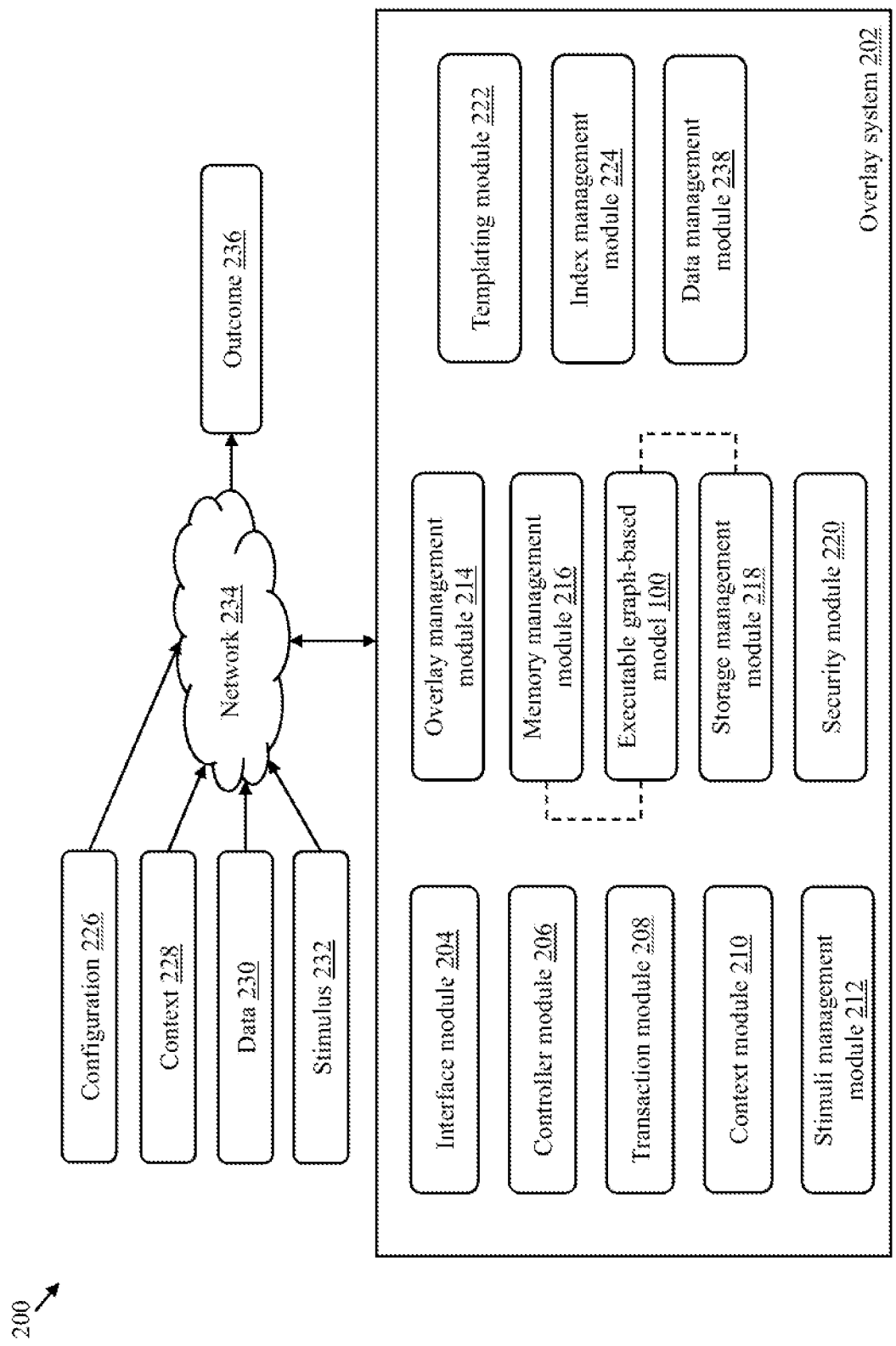
FIG. 2 is a block diagram that illustrates a system environment of an overlay system for execution, management, and configuration of executable graph-based models, in accordance with an embodiment of the present disclosure.

FIG. 2 is a block diagram that illustrates a system environment 200 of an overlay system 202 for execution, management, and configuration of executable graph-based models, in accordance with an embodiment of the present disclosure. Referring to FIG. 2, the overlay system 202 includes the executable graph-based model 100. The overlay system 202 further includes an interface module 204, a controller module 206, a transaction module 208, a context module 210, a stimuli management module 212, an overlay management module 214, a memory management module 216, a storage management module 218, a security module 220, a templating module 222, and an index management module 224. FIG. 2 further shows a configuration 226, a context 228, data 230, a stimulus 232, a network 234, and an outcome 236.

The overlay system 202 may include suitable logic, circuitry, interfaces, and/or code, executable by the circuitry, that may be configured to facilitate indexing in the executable graph-based models (such as the executable graph-based model 100). The executable graph-based model 100 corresponds to an application-specific combination of data and processing functionality which is manipulated, processed, and/or otherwise handled by the other modules within the overlay system 202 for implementing and utilizing indexing therein based on the stimulus 232 received by the overlay system 202. The stimulus 232 corresponds to a command or a query.

The interface module 204 may include suitable logic, circuitry, interfaces, and/or code, executable by the circuitry, configured to provide a common interface between internal modules of the overlay system 202 and/or external sources. The interface module 204 provides an application programmable interface (API), scripting interface, or any other suitable mechanism for interfacing externally or internally with any module of the overlay system 202. As shown in FIG. 1, the configuration 226, the context 228, the data 230, and the stimulus 232 are received by the interface module 204 via the network 234. Similarly, outputs produced by the overlay system 202, such as the outcome 236, are passed by the interface module 204 to the network 234 for consumption or processing by external systems. In one embodiment, the interface module 204 supports one or more messaging patterns or protocols such as the simple object access protocol (SOAP), the representational state transfer (REST) protocol, or the like. The interface module 204 thus allows the overlay system 202 to be deployed in any number of application areas, operational environments, or architecture deployments. Although not illustrated in FIG. 1, the interface module 204 is communicatively coupled (e.g., connected either directly or indirectly) to one or more other modules or elements within the overlay system 202 (such as the controller module 206, the context module 210, the executable graph-based model 100, or the like). In one embodiment, the interface module 204 is communicatively coupled (e.g., connected either directly or indirectly) to one or more overlays within the executable graph-based model 100.

The controller module 206 may include suitable logic, circuitry, interfaces, and/or code, executable by the circuitry, configured to handle and process interactions and executions within the overlay system 202. As will be described in more detail below, stimuli (such as the stimulus 232) and their associated contexts provide the basis for all interactions within the executable graph-based model 100. Processing of such stimuli may lead to execution of processing logic associated with one or more overlays within the executable graph-based model 100. The processing of the stimuli within the overlay system 202 may be referred to as a system transaction. The processing and execution of stimuli (and associated overlay execution) within the overlay system 202 is handled by the controller module 206. The controller module 206 manages all received input stimuli (e.g., the stimulus 232) and processes them based on a corresponding context (e.g., the context 228). The context 228 determines the priority that is assigned to processing the corresponding stimulus by the controller module 206 or the context module 210. This allows each stimulus to be configured with a level of importance and prioritization within the overlay system 202.

The controller module 206 may maintain the integrity of the modules within the overlay system 202 before, during, and after a system transaction. The transaction module 208, which is associated with the controller module 206, is responsible for maintaining the integrity of the overlay system 202 through the lifecycle of a transaction. Maintaining system integrity via the controller module 206 and the transaction module 208 allows a transaction to be rolled back in an event of an expected or unexpected software or hardware fault or failure. The controller module 206 is configured to handle the processing of the stimulus 232 and transactions through architectures such as parallel processing, grid computing, priority queue techniques, or the like. In one embodiment, the controller module 206 and the transaction module 208 are communicatively coupled (e.g., connected either directly or indirectly) to one or more overlays within the executable graph-based model 100.

As stated briefly above, the overlay system 202 utilizes a context-driven architecture whereby the stimulus 232 within the overlay system 202 is associated with the context 228 which is used to adapt the handling or processing of the stimulus 232 by the overlay system 202. The handling or processing of the stimulus 232 is done based on the context 228 associated therewith. Hence, the stimulus 232 is considered to be a contextualized stimulus. The context 228 may include details such as user name, password, access token, device information, time stamp, one or more relevant identifiers, or the like, that are required for processing of stimuli within the executable graph-based model 100. Each context within the overlay system 202 may be extended to include additional information that is required for the processing of the stimuli (e.g., a query, a command, or an event).

The context module 210 may include suitable logic, circuitry, interfaces, and/or code, executable by the circuitry, configured to manage the handling of contexts within the overlay system 202, and is responsible for processing any received contexts (e.g., the context 228) and translating the received context to an operation execution context. In some examples, the operation execution context is larger than the received context because the context module 210 supplements the received context with further information necessary for the processing of the received context. The context module 210 passes the operational execution context to one or more other modules within the overlay system 202 to drive communication of one or more messages associated with the operational execution context. Contexts within the overlay system 202 can be external or internal. While some contexts apply to all application areas and problem spaces, some applications may require specific contexts to be generated and used to process the received stimulus 232. As will be described in more detail below, the executable graph-based model 100 is configurable (e.g., via the configuration 226) so as only to execute within a given execution context for a given stimulus.

The stimuli management module 212 may include suitable logic, circuitry, interfaces, and/or code, executable by the circuitry, configured to process externally received stimuli (e.g., the stimulus 232) and any stimuli generated internally from any module within the overlay system 202. The stimuli management module 212 is communicatively coupled (e.g., connected either directly or indirectly) to one or more overlays within the executable graph-based model 100 to facilitate the processing of stimuli within the executable graph-based model 100. The overlay system 202 utilizes different types of stimuli such as a command (e.g., a transactional request), a query, or an event received from an external system such as an Internet-of-Things (IoT) device. As previously stated, a stimulus (such as the stimulus 232) can be either externally or internally generated. In an example, the stimulus 232 may be a message that is internally triggered (generated) from any of the modules within the overlay system 202. Such internal generation of the stimulus 232 indicates that something has happened within the overlay system 202 such that subsequent handling by one or more other modules within the overlay system 202 may be required. Internal stimulus 232 can also be triggered (generated) from the execution of processing logic associated with overlays within the executable graph-based model 100. In another example, the stimulus 232 may be externally triggered and may be generated based on an input received via a user interface associated with the controller module 206. The externally triggered stimulus 232 may be received in the form of a textual, audio, or visual input. The externally triggered stimulus 232 may be associated with the intent of a user to execute an operation indicated by the stimulus 232. The operation is executed in accordance with information included in the context 228 associated with the stimulus 232.

The stimuli management module 212 may receive the stimuli in real-time or near-real-time and communicate the received stimulus 232 to one or more other modules or nodes of the executable graph-based model 100. In some examples, the stimuli are scheduled in a batch process. The stimuli management module 212 utilizes any suitable synchronous or asynchronous communication architectures or approaches in communicating the stimuli (along with associated information). The stimuli within the overlay system 202 are received and processed (along with a corresponding context) by the stimuli management module 212, which then determines the processing steps to be performed for execution of operation associated with each stimulus. In one embodiment, the stimuli management module 212 processes the received stimuli in accordance with a predetermined configuration (e.g., the configuration 226) or dynamically determines what processing needs to be performed based on the contexts associated with the stimuli and/or based on a state of the executable graph-based model 100. The state of the executable graph-based model 100 refers to the current state of each node of the executable graph-based model 100 at a given point in time. The state of the executable graph-based model 100 is dynamic and hence may change based on the execution of an operation by any of its nodes. In some examples, the processing of a stimulus (such as the stimulus 232) results in the generation, maintenance, or utilization of one or more index records that further result in one or more outcomes being generated (e.g., the outcome 236). Such outcomes are either handled internally by one or more modules in the overlay system 202 or communicated via the interface module 204 as an external outcome. In one embodiment, all stimuli and corresponding outcomes are recorded for auditing and post-processing purposes by, for example, an operations module (not shown) and/or an analytics module (not shown) of the overlay system 202.

The overlay management module 214 may include suitable logic, circuitry, interfaces, and/or code, executable by the circuitry, configured to manage all overlays within the overlay system 202. Operations performed by the overlay management module 214 include overlay storage management, overlay structure modeling, overlay logic creation and execution, and overlay loading and unloading (within the executable graph-based model 100). The overlay management module 214 is communicatively coupled (e.g., connected either directly or indirectly) to one or more other modules within the overlay system 202 to complete some or all of these operations. For example, overlays can be persisted in some form of physical storage using the storage management module 218 (as described in more detail below). As a further example, overlays can be compiled and preloaded into memory via the memory management module 216 for faster run-time execution.

The memory management module 216 may include suitable logic, circuitry, interfaces, and/or code, executable by the circuitry, configured to manage and optimize the memory usage of the overlay system 202. The memory management module 216 thus helps to improve the responsiveness and efficiency of the processing performed by one or more of the modules within the overlay system 202 by optimizing the memory handling performed by these modules. The memory management module 216 uses direct memory or some form of distributed memory management architecture (e.g., a local or remote caching solution). Additionally, or alternatively, the memory management module 216 deploys multiple different types of memory management architectures and solutions (e.g., reactive caching approaches such as lazy loading or a proactive approach such as write-through cache may be employed). These architectures and solutions are deployed in the form of a flat (single-tiered) cache or a multi-tiered caching architecture where each layer of the caching architecture can be implemented using a different caching technology or architecture solution approach. In such implementations, each cache or caching tier can be configured (e.g., by the configuration 226) independently of the requirements for one or more modules of the overlay system 202. For example, data priority and an eviction strategy, such as least-frequently-used (LFU) or least-recently-used (LRU), can be configured for all or parts of the executable graph-based model 100. In one embodiment, the memory management module 216 is communicatively coupled (e.g., connected either directly or indirectly) to one or more overlays within the executable graph-based model 100.

The storage management module 218 may include suitable logic, circuitry, interfaces, and/or code, executable by the circuitry, configured to manage the temporary or permanent storage of data associated with indexing within the overlay system 202. The storage management module 218 is any suitable low-level storage device solution (such as a file system) or any suitable high-level storage technology such as another database technology (e.g., relational database management system (RDBMS) or NoSQL database). The storage management module 218 is directly connected to the storage device upon which the relevant data is persistently stored. For example, the storage management module 218 can directly address the computer-readable medium (e.g., hard disk drive, external disk drive, or the like) upon which the data is being read or written. Alternatively, the storage management module 218 is connected to the storage device via a network such as the network 234. As will be described in more detail later in the present disclosure, the storage management module 218 uses 'manifests' to manage the interactions between the storage device and the modules within the overlay system 202. In one embodiment, the storage management module 218 is communicatively coupled (e.g., connected either directly or indirectly) to one or more overlays within the executable graph-based model 100.

As described, storage, loading, and unloading of the executable graph-based model 100 or one or more components thereof are facilitated by the memory management module 216 and the storage management module 218. The memory management module 216 and the storage management module 218 may facilitate such operations by interacting with the storage device. In the present disclosure, the executable graph-based model 100 may be stored in a storage element. The storage element corresponds to a combination of the memory management module 216 and storage management module 218 that may be configured to store the executable graph-based model 100. In some embodiments, the storage element may be a storage module that is managed by the memory management module 216 and storage management module 218, collectively.

The security module 220 may include suitable logic, circuitry, interfaces, and/or code, executable by the circuitry, configured to manage the security of the overlay system 202. This includes security at a system level and a module level. Security is hardware-related, network-related, or software-related, depending on the operational environment, the architecture of the deployment, or the data and information contained within the overlay system 202. For example, if the system is deployed with a web-accessible API (as described above in relation to the interface module 204), the security module 220 can enforce a hypertext transfer protocol secure (HTTPS) protocol with the necessary certification. As a further example, if the data or information associated with the message received or processed by the overlay system 202 contains Personally Identifiable Information (PII) or Protected Health Information (PHI), the security module 220 can implement one or more layers of data protection to ensure that the PII or PHI are correctly processed and stored. In an additional example, in implementations where the overlay system 202 operates on United States of America citizen medical data, the security module 220 may enforce additional protections or policies as defined by the United States Health Insurance Portability and Accountability Act (HIPAA). Similarly, if the overlay system 202 is deployed in the European Union (EU), the security module 220 may enforce additional protections or policies to ensure that the data processed and maintained by the overlay system 202 complies with the General Data Protection Regulation (GDPR). In one embodiment, the security module 220 is communicatively coupled (e.g., connected either directly or indirectly) to one or more overlays within the executable graph-based model 100, thereby directly connecting security execution to the data/information in the executable graph-based model 100.

The templating module 222 may include suitable logic, circuitry, interfaces, and/or code, executable by the circuitry, configured to enable the overlay system 202 to implement a templated version of one or more nodes of the executable graph-based model 100. The templating module 222 may be configured to create one or more predefined templates in the executable graph-based model 100. The templating module 222 may be further configured to generate one or more node instances of the predefined templates for the implementation of the templated version of the executable graph-based model 100. Notably, the templating module 222 ensures ontology integrity by enforcing structure and rules of a template when generating instances of the template at run-time. Ontology integrity refers to consistency, accuracy, and correctness of an ontology. Thus, the templating module 222 ensures that the consistency, accuracy, and correctness of the ontology of the executable graph-based model 100 are maintained while generating the instances of the template at run-time. The templating module 222 may be communicatively coupled (i.e., connected either directly or indirectly) to one or more nodes and/or one or more overlays within the executable graph-based model 100.

The index management module 224 may include suitable logic, circuitry, interfaces, and/or code, executable by the circuitry, configured to facilitate indexing in the executable graph-based model 100. Operations performed by the index management module 224 may include the generation, maintenance, and utilization of the index records in the executable graph-based model 100. The index management module 224 is communicatively coupled (e.g., connected either directly or indirectly) to one or more other modules within the overlay system 202 to complete some or all of the aforementioned operations. The index management module 224 is further communicatively coupled (i.e., connected either directly or indirectly) to one or more nodes and/or one or more overlays within the executable graph-based model 100.

In addition to the abovementioned components, the overlay system 202 further includes a data management module 238. The data management module 238 may include suitable logic, circuitry, interfaces, and/or code, executable by the circuitry, configured to manage all data or information within the overlay system 202 (e.g., the data 230) for a given application. Operations performed by the data management module 238 include data loading, data unloading, data modeling, and data processing. The data management module 238 is communicatively coupled (e.g., connected either directly or indirectly) to one or more other modules within the overlay system 202 to complete some or all of these operations. For example, data storage is handled by the data management module 238 in conjunction with the storage management module 218.

In some embodiments, the functionality of two or more of the modules included in the overlay system 202 may be combined within a single module. Conversely, the functionality of a single module can be split into two or more further modules which can be executed on two or more devices. The modules described above in relation to the overlay system 202 can operate in a parallel, distributed, or networked fashion. The overlay system 202 may be implemented in software, hardware, or a combination thereof. Examples of suitable hardware modules include a general-purpose processor, a field programmable gate array (FPGA), and/or an application-specific integrated circuit (ASIC). Software modules can be expressed in a variety of software languages such as C, C++, Java, Ruby, Visual Basic, Python, and/or other object-oriented, procedural, or programming languages.

It will be apparent to a person skilled in the art that whilst only one executable graph-based model 100 is shown in FIG. 2, in other embodiments the overlay system 202 stores and maintains more than one executable graph-based model, without deviating from the scope of the present disclosure. In such embodiments, indexing in each executable graph-based model is executed in a manner that is similar to the executable graph-based model 100.

In some embodiments, all the modules of the overlay system 202 except for the executable graph-based model 100 may collectively form processing circuitry that executes operations associated with the facilitating of indexing in the overlay system 202.

Having described the overlay system 202 for executing and managing executable graph-based models, the description will now turn to the elements of an executable graph-based model; specifically, the concept of a node. Unlike conventional graph-based systems, all elements (e.g., data, overlays, etc.) within the executable graph-based model (e.g., the executable graph-based model 100) are implemented as nodes. As will become clear, this allows executable graph-based models to be flexible, extensible, and highly configurable.

Figure 3:
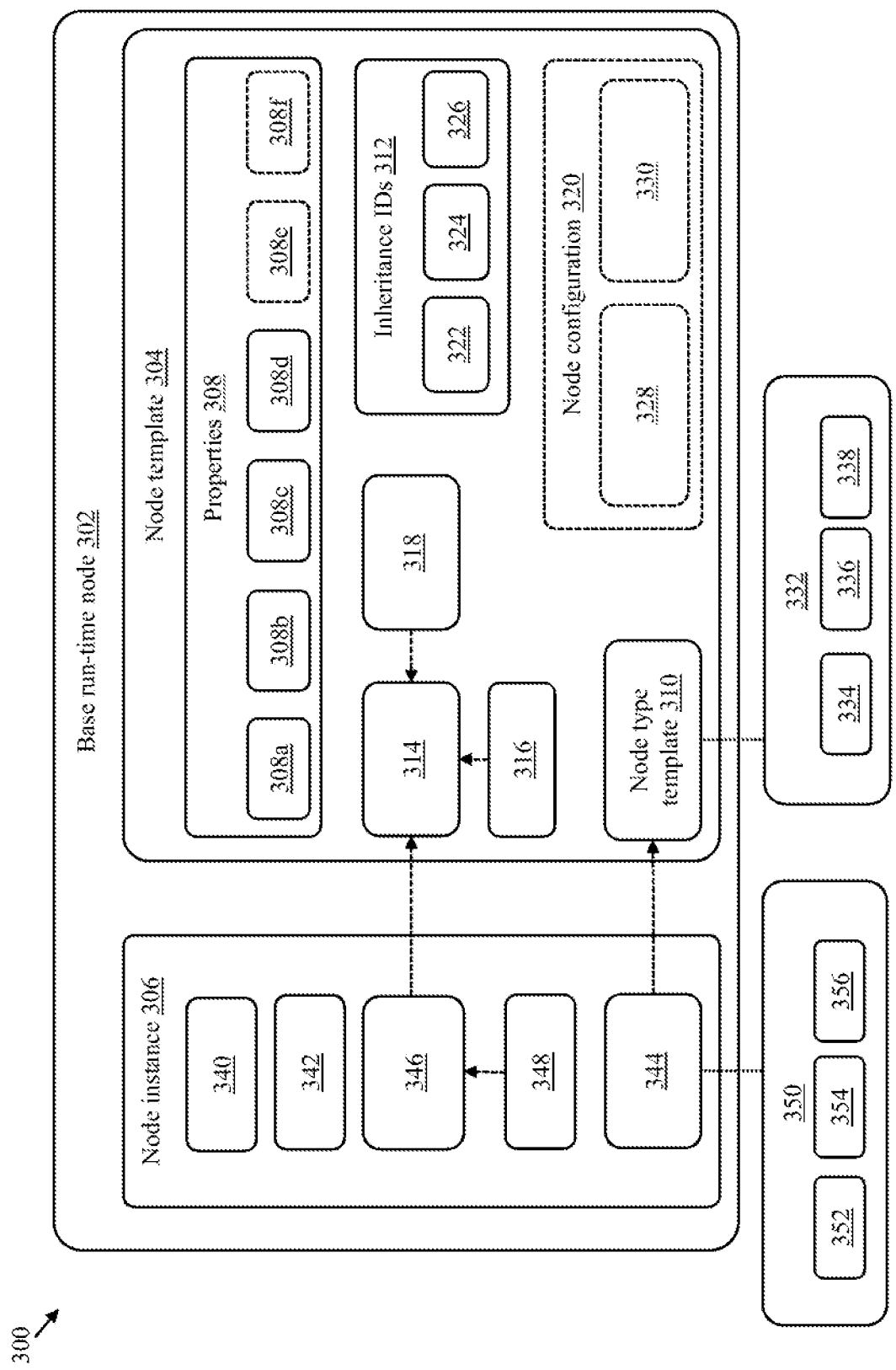
FIG. 3 is a block diagram that illustrates a generic structure of a base run-time node within the executable graph-based model, in accordance with an embodiment of the present disclosure.

FIG. 3 is a block diagram 300 that illustrates a generic structure of a base run-time node 302 within the executable graph-based model 100, in accordance with an embodiment of the present disclosure. Referring to FIG. 3, the base run-time node 302 corresponds to the core structure of the executable graph-based model 100 and forms the foundational building block for all data and processing logic within the executable graph-based model 100. The base run-time node 302 is shown to include a node template 304 and a node instance 306. The node instance 306 is generated according to the node template 304. The base run-time node 302 shown in FIG. 3 is a compositional structure that is generated and executed, at run-time as part of the executable graph-based model 100. In other words, the node template 304 is defined 'offline' and the node instance 306 and the base run-time node 302 are run-time structures that are dynamically generated during execution of the executable graph-based model 100.

The node template 304 comprises a predetermined node structure. Further, the node template 304 defines one or more rules that govern the generation of the node instance 306. The node instance 306 is an implementation of the node template 304. In other words, the node instance 306 is generated based on the predetermined node structure and the one or more rules of the node template 304. The node template 304 cannot be modified during the execution but may be modified during offline mode or at rest. During execution, only the node instance 306 of the base run-time node 302 may be modified.

The node template 304 includes properties 308, a node type template 310, inheritance IDs 312, a set of attribute templates 314, and a set of keys 316. The node template 304 may optionally include metadata 318 and node configuration 320. The properties 308 of the node template 304 include a unique identifier (ID) 308*a*, a version ID 308*b*, a namespace 308*c*, a name 308*d*, and optionally include one or more icons 308e and a set of labels 308f. The inheritance IDs 312 comprise an abstract flag 322, a leaf flag 324, and a root flag 326. The node configuration 320 optionally comprises one or more node configuration strategies 328 and/or one or more node configuration extensions 330. FIG. 3 further shows a plurality of predetermined node type templates 332. The plurality of predetermined node type templates 332 include a vertex node type template 334, an edge node type template 336, and an overlay node type template 338. Further, the node instance 306 includes a unique ID 340, a version ID 342, a node type instance 344, and a set of attribute instances 346. The node instance 306 may optionally include metadata 348. FIG. 3 further shows a plurality of predetermined node type instances 350. The plurality of predetermined node type instances 350 include a vertex node type instance 352, an edge node type instance 354, and an overlay node type instance 356.

The unique ID 308a is unique for each node template within the executable graph-based model 100. Similarly, the unique ID 340 is unique for each node instance within the executable graph-based model 100. The unique ID 308a and the unique ID 340 are used to register, manage, and reference the node template 304 and the node instance 306, respectively, within the overlay system 202. The version ID 308b of the node template 304 is incremented when the node template 304 undergoes transactional change. Similarly, the version ID 342 of the node instance 306 is incremented when the node instance 306 undergoes transactional change. The namespace 308c of the node template 304, along with the name 308d of the node template 304, is used to help organize node templates within the executable graph-based model 100. That is, the node template 304 is assigned a unique name within the namespace 308c such that the name 308d of the node template 304 need not be unique within the entire executable graph-based model 100, only within the context of the namespace 308c to which the node template 304 is assigned. The node template 304 optionally comprises one or more icons 308e which are used to provide a visual representation of the node template 304. The one or more icons 308e can include icons at different resolutions and display contexts such that the visualization of the node is adapted to different display settings and contexts. The node template 304 also optionally comprises the set of labels 308f which are used to override the name 308d when the node template 304 is rendered or visualized.

The node template 304 supports the software development feature of multiple inheritance by maintaining references (not shown) to zero or more other node templates, which then act as the base of the node template 304. This allows the behavior and functionality of a node template to be extended or derived from one or more other node templates within an executable graph-based model. The node instance 306 likewise supports multiple inheritance because it is an instance representation of the node template 304. The multiple inheritance structure of the node instance 306 is, however, limited to the corresponding instance realization of the multiple inheritance structure defined by the node template 304, i.e., one node instance 306 is created and managed for each node template 304 defined in the inheritance hierarchy for a node instance of a node template.

The inheritance IDs 312 of the node template 304 indicate the inheritance-based information, which is applicable, or can be applicable, to the node template 304. The inheritance IDs 312 comprise a set of Boolean flags that identify the inheritance structure of the node template 304. The abstract flag 322 of the inheritance IDs 312 allows the node template 304 to support the construct of abstraction. When the abstract flag 322 takes a value of 'true', the node template 304 is flagged as abstract meaning that it cannot be instantiated or created within an executable graph-based model. Thus, a node template having the abstract flag 322 set to 'true' can only form the foundation of another node template that inherits from it. By default, the abstract flag 322 of a node template is set to 'false'. The leaf flag 324 of the inheritance IDs 312 is used to indicate whether any other node template can inherit from the node template 304. If the leaf flag 324 is set to 'true', then no other node template can inherit from the node template 304 (but unlike an abstract node, a node template with a leaf flag set can still be instantiated and created within an executable graph-based model). The root flag 326 of the inheritance IDs 312 is used to indicate whether the node template 304 inherits from any other node template. If the root flag 326 is set to 'true', then the node template 304 does not inherit from any other node template. The node template 304 is flagged as leaf (i.e., the leaf flag 324 is set to 'true') and/or root (i.e., the root flag 326 is set to 'true'), or neither (i.e., both the leaf flag 324 and the root flag 326 are set to 'false'). It will be apparent to the person skilled in the art that a node template cannot be flagged as both abstract and leaf (i.e., the abstract flag 322 cannot be set to 'true' whilst the leaf flag 324 is set to 'true').

All elements within the executable graph-based model 100 are defined as node templates or node instances. The functionality of the node template 304 and the node instance 306 are realized due to the use of the node type template 310 and the node type instance 344. The node type template 310 of the node template 304 is used to extend the functionality of the node template 304 by defining the standard set of capabilities, including data and associated behavior. The vertex node type template 334 (also referred to as a data node type template) includes a template of common data structures and functionality related to the 'things' modeled in the graph (e.g., the data). The vertex node type instance 352 includes the common data structures and functionality related to the 'things' modeled in the graph based on the vertex node type template 334. The edge node type template 336 includes a template of common data structures and functionality related to joining two or more nodes. A node instance having the edge node type instance 354 may connect two or more nodes and thus the edge node type instance 354 constructs associations and connections between nodes (for example objects or 'things') within the executable graph-based model 100. The edge node type instance 354 is not restricted to the number of nodes that can be associated or connected by a node having the edge node type instance 354. The data structures and functionality of the edge node type instance 354 thus define a hyper-edge which allows two or more nodes to be connected through a defined set of roles. A role defines a connective relationship between the two or more nodes, and hence, allows an edge node to connect two or more nodes such that the two or more nodes may have more than one relationship therebetween. The plurality of predetermined node type templates 332 further includes the overlay node type template 338. The overlay node type template 338 is used to extend the functionality of a node template (e.g., the node template 304) to incorporate processing logic. Similarly, the overlay node type instance 356 is used to extend the functionality of a node instance (e.g., the node instance 306) to incorporate processing logic.

The set of attribute templates 314 corresponds to the data defined by the node template 304. For example, the set of attribute templates 314 may define the names and value types (e.g., integer, string, float, etc.) of one or more attributes but not the values of these attributes. The values of the set of attribute templates 314 may be defined by the set of attribute instances 346 of the node instance 306 through one or more values or instance values. For example, the node template 304 may define a string attribute 'surname' and the corresponding node instance 306 may assign the instance value 'Bell-Richards' to this string attribute. Each attribute instance of the set of attribute instances 346 is associated with an attribute template of the set of attribute templates 314. The node template 304 may define one or more default values for the set of attribute templates 314. The default values correspond to the values that the attributes take if no value is assigned. The metadata 318 (e.g., data stored as a name, value type, and value triplet) is associated with either the node template 304 or one or more of the set of attribute templates 314 of the node template 304. Similarly, the node instance 306 also optionally comprises the metadata 348 (e.g., data stored as a name, value type, and value triplet) which is associated with either the node instance 306 or one or more of the set of attribute instances 346.

Each key of the set of keys 316 is defined based on one or more attribute templates of the set of attribute templates 314. In an example, the set of attribute templates 314 includes a first attribute template, a second attribute template, and a third attribute template, and the set of keys 316 includes a first key and a second key. In such an example, the first key is based on the first attribute template, and the second key is based on the second attribute template and the third attribute template. A number of keys in the set of keys 316 is same as a number of index nodes associated with the node template 304, in the executable graph-based model 100. An index node includes common data structures and functionality for maintaining one or more index records of one or more node instances that are associated with node template 304. Further, each key of the set of keys 316 indicates that an index record is to be created and maintained for each node instance that is generated based on the node template 304. An index record refers to a data structure that includes an index value (such as an attribute instance of the set of attribute instances 346) that is based on a key of the set of keys 316, and an ID (such as the unique ID 340) associated with the index value. The index nodes are further defined in detail in conjunction with FIG. 6.

The node configuration 320 provides a high degree of configurability for the different elements of a node template and/or a node instance. An example of a concrete node configuration strategy is an ID strategy, associated with the configuration of the unique ID 308a of the node template 304. A further example of a concrete node configuration strategy is a versioning strategy, associated with the configuration of the version ID 308b of the node template 304 which supports major and minor versioning (depending on the type of transactional change incurred). The versioning strategy may be adapted to a native filing system of a user device hosting the overlay system 202 or a third-party data storage (for example, Snowflake®, or the like) associated with the overlay system 202.

Figure 4:
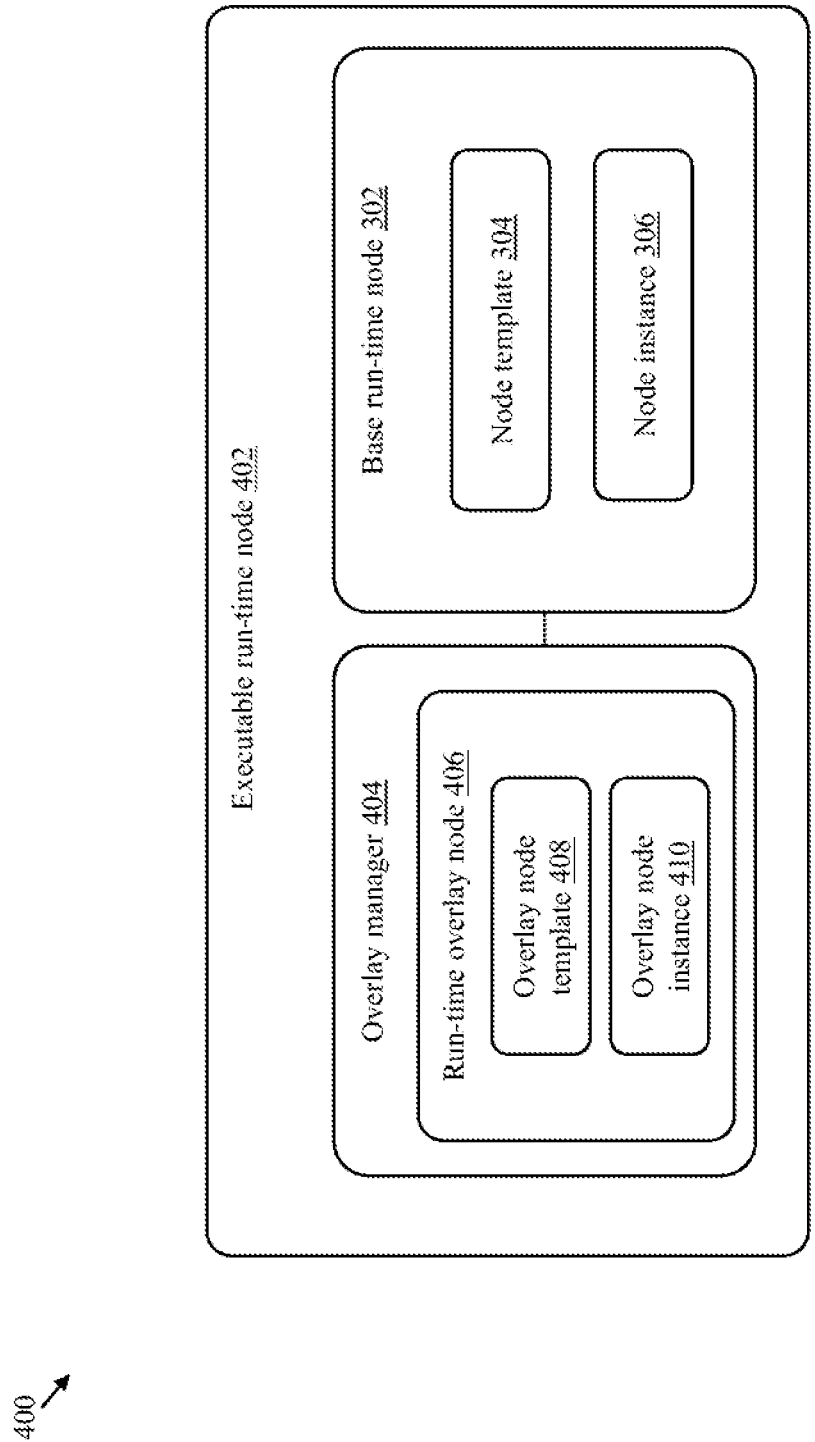
FIG. 4 is a block diagram that illustrates an executable run-time node within the executable graph-based model, in accordance with an embodiment of the present disclosure.

FIG. 4 is a block diagram 400 that illustrates an executable run-time node 402 within the executable graph-based model 100, in accordance with an embodiment of the present disclosure. Referring to FIG. 4, the executable run-time node 402 is shown to include the base run-time node 302 and an overlay manager 404. The overlay manager 404 includes a run-time overlay node 406. The executable run-time node 402 provides processing functionality (e.g., processing logic) to the base run-time node 302 via one or more associated overlay nodes (for example, the run-time overlay node 406). Beneficially, the data and processing capability of the base run-time node 302 may be dynamically and significantly extended using the concept of an executable run-time node (for example, the executable run-time node 402).

Although, the executable run-time node 402 is shown to include a single run-time overlay node (e.g., the run-time overlay node 406), in other embodiments, the executable run-time node 402 may include any number of run-time overlay nodes.

The executable run-time node 402 extends the base run-time node 302 (or is a subtype of the base run-time node 302) such that all the functionality and properties of the base run-time node 302 are accessible to the executable run-time node 402. The executable run-time node 402 also dynamically extends the functionality of the base run-time node 302 by associating the run-time overlay nodes maintained by the overlay manager 404 with the base run-time node 302. The executable run-time node 402 may thus be considered a composition of the base run-time node 302 and the run-time overlay node 406. The executable run-time node 402 may be alternatively referred to as a node with overlay(s). Therefore, the executable run-time node 402 acts as a decorator of the base run-time node 302 adding the functionality of the overlay manager 404 to the base run-time node 302.

It will be apparent to a person skilled in the art that the base run-time node 302 refers to any suitable node within the executable graph-based model 100. As such, the base run-time node 302 may be a node having a type such as a vertex node type, an edge node type, or the like. Alternatively, the base run-time node 302 may itself be an executable node such that the functionality of the (executable) base run-time node 302 is dynamically extended. In this way, complex and powerful processing functionality can be dynamically generated by associating and extending overlay nodes.

The overlay manager 404 registers and maintains one or more run-time overlay nodes (such as the run-time overlay node 406) associated with the base run-time node 302. The assignment of the run-time overlay node 406 to the base run-time node 302 (via the overlay manager 404) endows the base run-time node 302 with processing logic and executable functionality defined within the run-time overlay node 406. In other words, the run-time overlay node 406 may interact at run-time, with the node template 304 and/or the node instance 306 of the base run-time node 302. In an example, the node template 304 and the node instance 306 are not executable nodes. That is, neither the node template 304 nor the node instance 306 comprises an overlay manager with one or more run-time overlay nodes. In another example, the node template 304 and/or the node instance 306 may be executable nodes thereby extending the functionality, complexity, and configurability of executable run-time nodes.

Extending the functionality of a base run-time node through one or more run-time overlay nodes is at the heart of the overlay system 202. As illustrated in FIG. 2, the data (e.g., a vertex node as represented by the base run-time node 302 in FIG. 4) and the functionality that acts upon that data (e.g., an overlay node) can be separated and independently maintained offline, but at run-time, an association between the data node and the run-time overlay node is determined and an executable run-time node is generated (e.g., the executable run-time node 402 shown in FIG. 4).

Each run-time overlay node comprises an overlay node template 408 and an overlay node instance 410. The overlay node template 408 is a node template with the overlay node type template 338. Similarly, the overlay node instance 410 is a node instance with the overlay node type instance 356. The overlay node instance 410 is an implementation of the overlay node template 408. The overlay node template 408 comprises one or more generic rules which may be implemented by the processing logic of the overlay node instance 410. For example, a rule may be defined in an overlay node template specifying that a hashing algorithm is to be used and an overlay instance associated with the overlay template provides a specific implementation of a hashing algorithm (e.g., Message-Digest Algorithm 5 (MD5), Secure Hash Algorithm-1 (SHA-1), SHA-2, or the like).

An overlay node, such as the run-time overlay node 406, is a node having an overlay node type (alternatively referred to as an overlay type) assigned to its node type. Examples of overlay node types include an encryption overlay node type, an obfuscation overlay node type, an audit overlay node type, an analytics overlay node type, a handler overlay node type, a publisher overlay node type, or the like. It will be apparent to a person skilled in the art that the list of overlay types is not exhaustive and the number of different overlay types that can be realized is not limited.

Because an overlay node is itself a node, all functionality of a node described in relation to the base run-time node 302 is thus applicable to an overlay node. For example, an overlay node includes a unique ID, a name, etc., can have attributes (e.g., an overlay node can have its data defined), supports multiple inheritance, and can be configured via node configurations. Furthermore, because an overlay node is a node, the overlay node can have one or more overlay nodes associated therewith (e.g., the overlay node may be an overlay node with an overlay). Moreover, the processing functionality of an overlay node extends to the node type of the node to which the overlay node is applied.

A run-time overlay node, such as the run-time overlay node 406, is not bound to a single executable node or a single executable graph-based model (unlike nodes that have non-overlay node types). This allows run-time overlay nodes to be centrally managed and reused across multiple instances of executable graph-based models. Notably, a node (for example, a base node, an executable node, and an overlay node) may be extended by way of overlays. Further, each overlay node may be extended to have one or more overlays. Such overlays may be termed chaining overlays.

Unlike non-run-time overlay nodes, a run-time overlay node includes processing logic (not shown in FIG. 4) which determines the functionality of the run-time overlay node. The processing logic of a run-time overlay node includes a block of executable code, or instructions, which carries out one or more operations associated with the facilitation of indexing within the executable graph-based model 100. The block of executable code is pre-compiled code, code that requires interpretation at runtime, or a combination of both. Different run-time overlay nodes provide different processing logic to realize different functionality. The overlay manager 404 of the executable run-time node 402 is responsible for executing all overlays registered therewith. The overlay manager 404 also coordinates the execution of all associated overlay nodes. As shown in FIG. 4, the executable run-time node 402 associates the base run-time node 302 with the run-time overlay node 406.

The data and the processing logic associated with one or more overlays of an executable node (for example, the executable run-time node 402) are persistent. The persistent nature of the data and the processing logic are described in detail in conjunction with FIG. 5.

Figure 5:
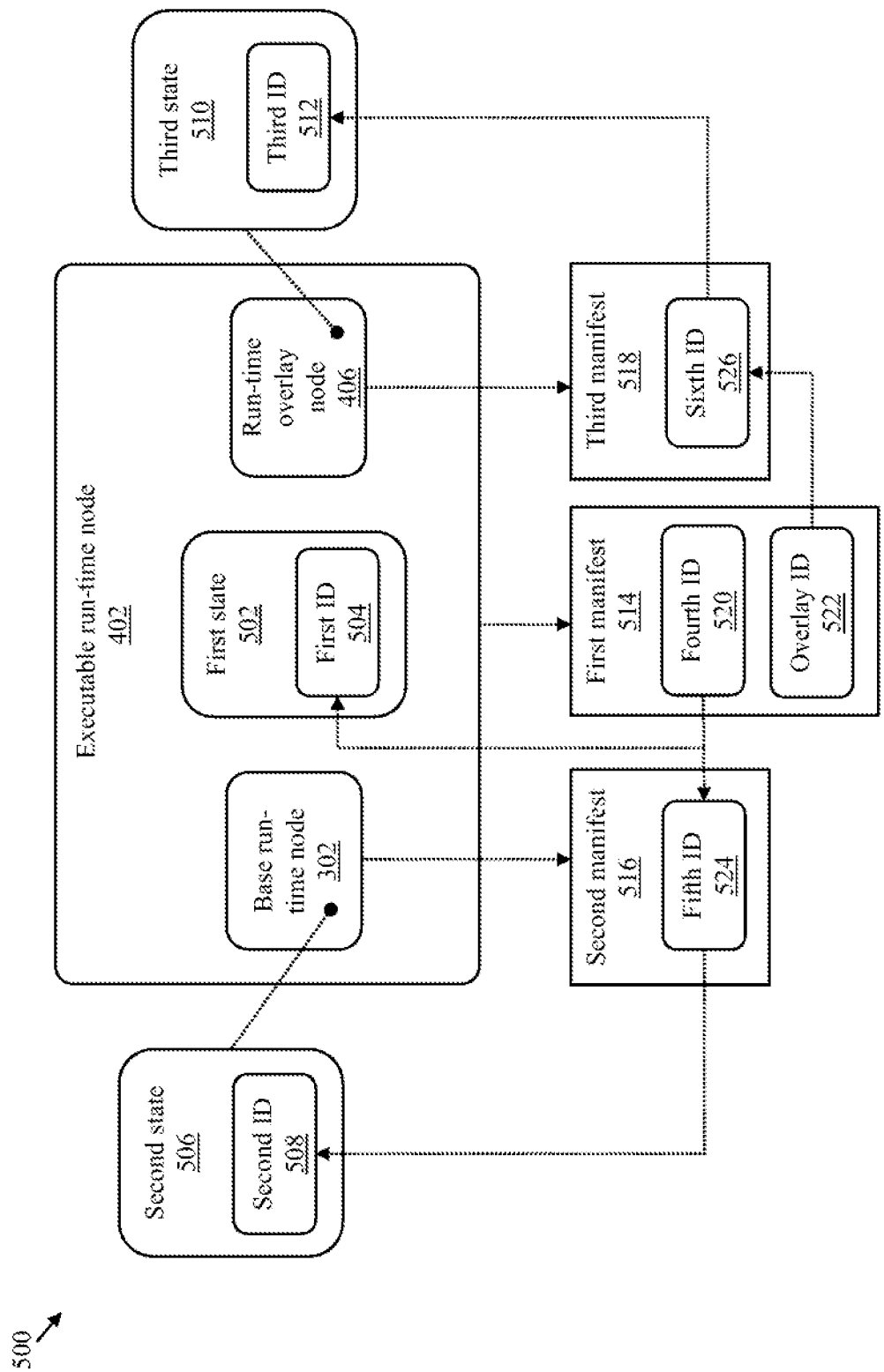
FIG. 5 is a block diagram that illustrates a composition of the executable run-time node that enables persistent storage of data and processing logic associated therewith, in accordance with an embodiment of the present disclosure.

FIG. 5 is a block diagram 500 that illustrates a composition of the executable run-time node 402 that enables persistent storage of data and processing logic associated therewith, in accordance with an embodiment of the present disclosure.

As described in conjunction with FIG. 4, the executable run-time node 402 includes the base run-time node 302 and the run-time overlay node 406.

Referring to FIG. 5, the executable run-time node 402 has a first state 502 having a first ID 504. The base run-time node 302 has a second state 506 having a second ID 508, and the run-time overlay node 406 has a third state 510 having a third ID 512. A manifest (for example, first through third manifests 514-518) is generated for each of the base run-time node 302, the executable run-time node 402, and the run-time overlay node 406. In an embodiment, the manifests may be generated by the storage management module 218. The first manifest 514 is associated with the executable run-time node 402 and has a fourth ID 520 and an overlay ID 522. The second manifest 516 is associated with the base run-time node 302 and has a fifth ID 524. The third manifest 518 is associated with the run-time overlay node 406 and has a sixth ID 526. Further, the manifests are stored at respective storage locations that may be centralized or distributed storage locations associated with the overlay system 202. The manifests may be stored by the storage management module 218.

The first state 502 of the executable run-time node 402 includes data required to reconstruct the executable run-time node 402 (e.g., attributes, properties, etc.). The first state 502 of the executable run-time node 402 is persistently stored along with the first ID 504. The first manifest 514 is generated for the executable run-time node 402 and has (i) the fourth ID 520 (which is the same as the first ID 504), (ii) the storage location of the first state 502 of the executable run-time node 402, and (iii) the overlay ID 522 (which is the same as the sixth ID 526). Notably, the fourth ID 520 is the same as the first ID 504 and the fifth ID 524, hence, the first manifest 514 includes the ID of the state of the base run-time node 302 and the executable run-time node 402. Further, the overlay ID 522 is the same as the sixth ID 526 of the state of the run-time overlay node 406. Therefore, the first manifest 514 may be used to identify and retrieve the states of the base run-time node 302, the executable run-time node 402, and the run-time overlay node 406. Subsequently, the retrieved states may be used to reconstruct the executable run-time node 402 and the run-time overlay node 406. In an instance, the executable run-time node 402 may be further extended to include additional run-time overlay nodes. In such an instance, the first manifest 514 may include state IDs of the additional run-time overlay nodes as well. A first manifest state (not shown) is then generated for the first manifest 514 and persistently stored along with the fourth ID 520.

The second state 506 of the base run-time node 302 includes data required to reconstruct the base run-time node 302 (e.g., attributes, properties, etc.) and is persistently stored along with the second ID 508. The second manifest 516 is generated for the base run-time node 302 and has (i) the fifth ID 524 and (ii) the storage location of the second state 506 of the base run-time node 302. The second ID 508 of the second state 506 and the fifth ID 524 of the second manifest 516 are the same as the first ID 504 of the first state 502 of the executable run-time node 402 (which is also the same as the fourth ID 520 of the first manifest 514 of the executable run-time node 402). As mentioned above, along with the first state 502, the first manifest 514 may also be used to identify and retrieve the second manifest 516 which in turn may be used to identify the second state 506 of the base run-time node 302. A second manifest state (not shown) is then generated for the second manifest 516 and persistently stored along with the fifth ID 524. Thus, the states, manifests, and manifest states for the executable run-time node 402 and the base run-time node 302 include the same, shared, ID. A shared ID can be used in this instance because the states, manifests, and manifest states are stored separately. The separate storage of the states, manifests, and manifest states exhibit a distributed architecture of the overlay system 202.

The third state 510 of the run-time overlay node 406 includes data required to reconstruct the run-time overlay node 406 (e.g., attributes, properties, processing logic, etc.) and is persistently stored along with the third ID 512. The third manifest 518 is generated for the run-time overlay node 406 and includes the sixth ID 526, which is the same as the third ID 512. Therefore, the first manifest 514 may be further used to identify and retrieve the third manifest 518 which in turn may be used to identify and retrieve the third state 510 of the run-time overlay node 406. A third manifest state (not shown) is then generated for the third manifest 518 and is persistently stored along with the sixth ID 526.

In operation, when the executable run-time node 402 is to be loaded, the transaction module 208, in conjunction with the storage management module 218, may execute one or more operations to retrieve the first manifest state stored at a known storage location. Based on the first manifest state, the storage management module 218 may re-construct the first manifest 514 which includes the fourth ID 520 which is the same as the fifth ID 524 of the second manifest 516. Based on the fifth ID 524, the storage management module 218 may identify the second manifest state and may generate the second manifest 516 based on which the second state 506 is identified. Subsequently, the base run-time node 302 is loaded and the storage management module 218 may determine that the base run-time node 302 is a node with overlay. Based on the fourth ID 520 (that is the same as the first ID 504 of the first state 502 of the executable run-time node 402) of the first manifest 514, the first state 502 is identified and retrieved. Subsequently, the executable run-time node 402 is loaded. Moreover, based on the overlay ID 522 (that is the same as the sixth ID 526 of the third manifest 518) of the first manifest 514, the third manifest state is identified and the third manifest 518 is generated. Subsequently, based on the sixth ID 526 (that is the same as the third ID of the third state) of the third manifest 518, the third state 510 is identified and retrieved. Based on the third state 510, the run-time overlay node 406 is reconstructed and loaded in the executable graph-based model 100.

In some embodiments, the run-time overlay node 406 may not be loaded in case it is not required for executing the operation associated with the stimulus 232. The loaded executable run-time node 402 and the run-time overlay node 406 may be unloaded in case they remain unused for a predefined time period whereas one or more executable nodes that are used at least once during the predefined time period may be permanently loaded in the executable graph-based model 100. In some embodiments, the data and processing logic associated with a loaded executable run-time node and/or run-time overlay node may be transferred to a local memory of the overlay system 202 if the data and the processing logic remain unused for a first predefined period of time. Further, the data and the processing logic associated with the executable run-time node/run-time overlay node are transferred to an external storage from the local memory in case the executable run-time node/run-time overlay node remains unused for a second predefined period of time. The second predefined period of time is greater than the first predefined period of time. The term unloading refers to storing a state of a node with a current version of data and processing logic associated therewith at a storage location that is pointed by the corresponding manifest.

An executable graph-based model (for example, the executable graph-based model 100) may be stored (and loaded) using the above-described composition. Beneficially, each component is stored separately thereby allowing a user to maintain and store their data independently of the storage of the structure and functionality of the executable graph-based model 100.

Notably, all manifest states are stored together at a storage location that is known to the storage management module 218. Such centralized storage of the manifest states ensures that node states associated therewith are easily accessible.

It will be apparent to a person skilled in the art that although FIG. 5 illustrates only a single run-time overlay node, in other embodiments, the executable run-time node 402 may include additional or different overlay nodes. It will also be apparent to a person skilled in the art that only those overlay nodes that are required for responding to the stimulus 232 may be loaded. Additionally, the node template 304 and the node instance 306 may be stored (and loaded) using the above-described composition.

Figure 6:
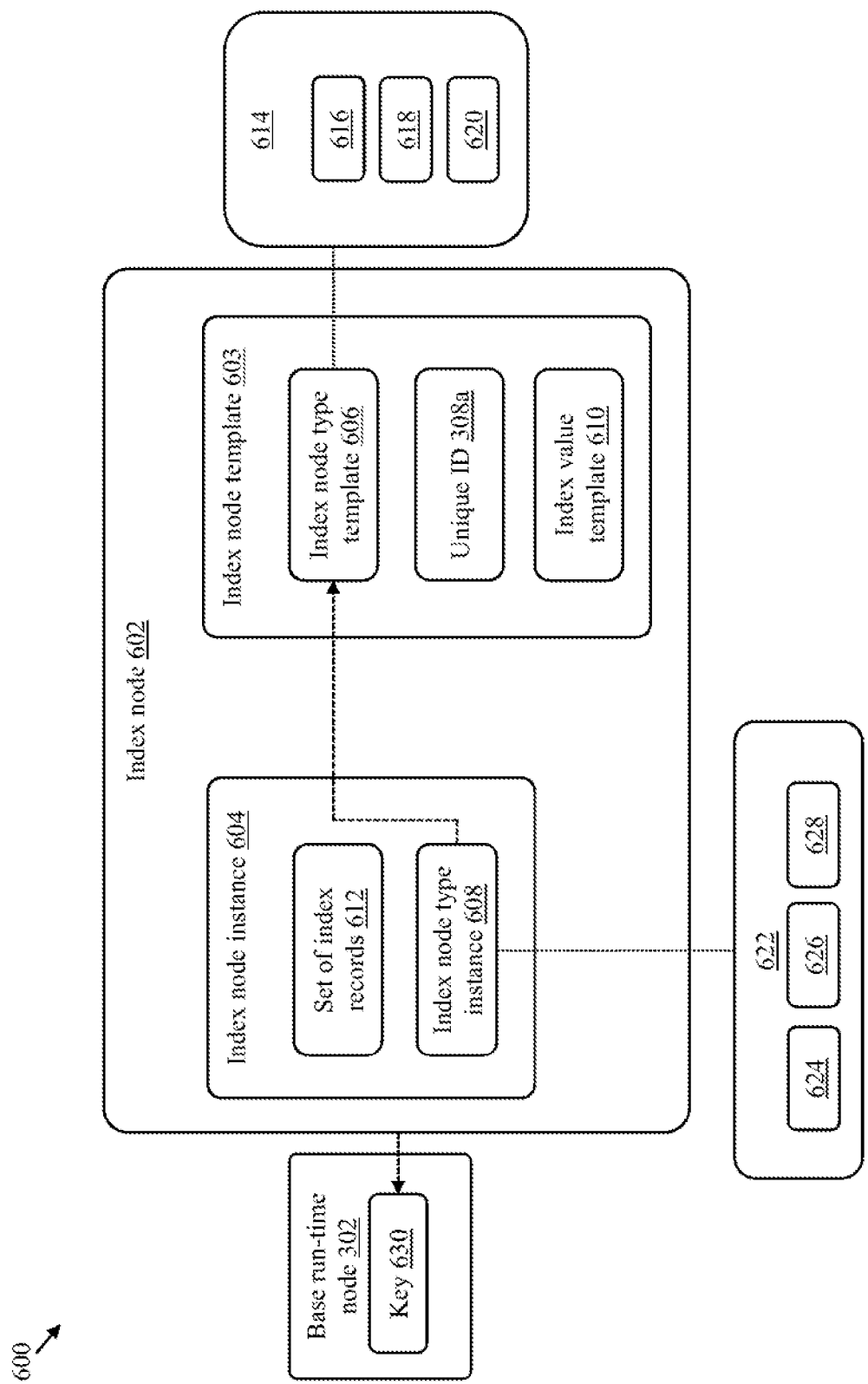
FIG. 6 is a block diagram that illustrates a generic structure of an index node within the executable graph-based model, in accordance with an embodiment of the present disclosure.

FIG. 6 is a block diagram 600 that illustrates a generic structure of an index node 602 within the executable graph-based model 100, in accordance with an embodiment of the present disclosure. An index node includes a set of index records to facilitate indexing in the executable graph-based model 100. Each index record includes a mapping between a unique ID (such as the unique ID 340) and one or more aspects of a node instance (such as one or more of the set of attribute instances 346 of the node instance 306). Each node template (such as the node template 304) is associated with one or more index nodes (such as the index node 602) based on one or more associated keys (such as the set of keys 316). In other words, one or more index nodes may be created in the executable graph-based model 100, in association with the node template, based on the one or more keys. Further, the index node maintains the index records of one or more node instances that are associated with the corresponding node template. In other words, the index node indexes the one or more node instances associated with the corresponding node template. Further, the index node 602 corresponds to a run-time node.

The index node 602 is shown to include an index node template 603 and an index node instance 604. The index node instance 604 is generated according to the index node template 603. More than one index node instance may be associated with the index node template 603. Further, the index node template 603 is similar to the node template 304 and includes the unique ID 308a and an index node type template 606. The index node 602 is associated with the node template 304 of the base run-time node 302. The unique ID 308a is included in the index node template 603, as the index node template 603 is associated with the node template 304, and the unique ID 308a is used to reference the node template 304. The inclusion of the unique ID 308a in the index node template 603 is indicative of an association between the index node 602 and the node template 304. The index node instance 604 is similar to the node instance 306 and includes an index node type instance 608. The index node template 603 further includes an index value template 610. The index value template 610 is defined based on the node template 304. The index node instance 604 further includes a set of index records 612. The set of index records 612 is associated with a set of node instances of the node template 304.

The index node type template 606 may be one of a plurality of predetermined index node type templates 614 that include an attribute index node type template 616, a metadata index node type template 618, and a label index node type template 620. Further, the index node type instance 608 may be one of a plurality of predetermined index node type instances 622 that include an attribute index node type instance 624, a metadata index node type instance 626, and a label index node type instance 628.

As shown in FIG. 3, the node instance 306 is associated with the node template 304. In such a scenario, the set of index records 612 includes one index record that is associated with the node instance 306. An index record includes an index value and a unique ID of the associated node instance. The index value is based on an index value template (such as the index value template 610).

The functionality of the index node template 603 and the index node instance 604 are realized due to the use of the index node type template 606 and the index node type instance 608. The index node type template 606 of the index node template 603 is used to extend the functionality of the index node template 603 by defining the standard set of capabilities, including data and associated behavior. When index node type template 606 corresponds to the attribute index node type template 616 and the index node type instance 608 corresponds to the attribute index node type instance 624, the index value template 610 corresponds to one or more of the set of attribute templates 314 and the index value of the node instance 306 corresponds to one or more values of the set of attribute instances 346. Similarly, when the index node type template 606 corresponds to the metadata index node type template 618 and the index node type instance 608 corresponds to the metadata index node type instance 626, the index value template 610 corresponds to one or more data elements of the metadata 318 and the index value of the node instance 306 corresponds to one or more data elements of the metadata 348. Additionally, when the index node type template 606 corresponds to the label index node type template 620 and the index node type instance 608 corresponds to the label index node type instance 628, the index value template 610 corresponds to one or more of the set of labels 308f and the index record of the node instance 306 includes only the unique ID 340.

For the sake of brevity, it is assumed that the index node type template 606 corresponds to the attribute index node type template 616 and the index node type instance 608 corresponds to the attribute index node in the forthcoming description of the present disclosure. In such a scenario, the index node 602 is defined based on one of the set of keys 316 (hereinafter referred to as a "key 630") of the node template 304. The index value template 610 includes one or more attribute templates of the set of attribute templates 314 based on which the key 630 is defined. In an example, the key 630 is defined based on the first attribute template of the set of attribute templates 314. In such an example, the index value template 610 corresponds to the first attribute template of the set of attribute templates 314. In another example, the key 630 is defined based on a combination of the first and second attribute templates of the set of attribute templates 314. In such an example, the index value template 610 corresponds to the combination of the first and second attribute templates.

In an example, where the index value template 610 corresponds to the first attribute template of the set of attribute templates 314, the index value present in the index record associated with the node instance 306 corresponds to a value of the first attribute instance of the set of attribute instances 346. In another example, where the index value template 610 corresponds to the combination of the first and second attribute templates, of the set of attribute templates 314, the index value present in the index record associated with the node instance 306 corresponds to a combination of values of the first and second attribute instances of the set of attribute instances 346. The set of index records 612 is described in detail in conjunction with FIG. 7.

Figure 7:
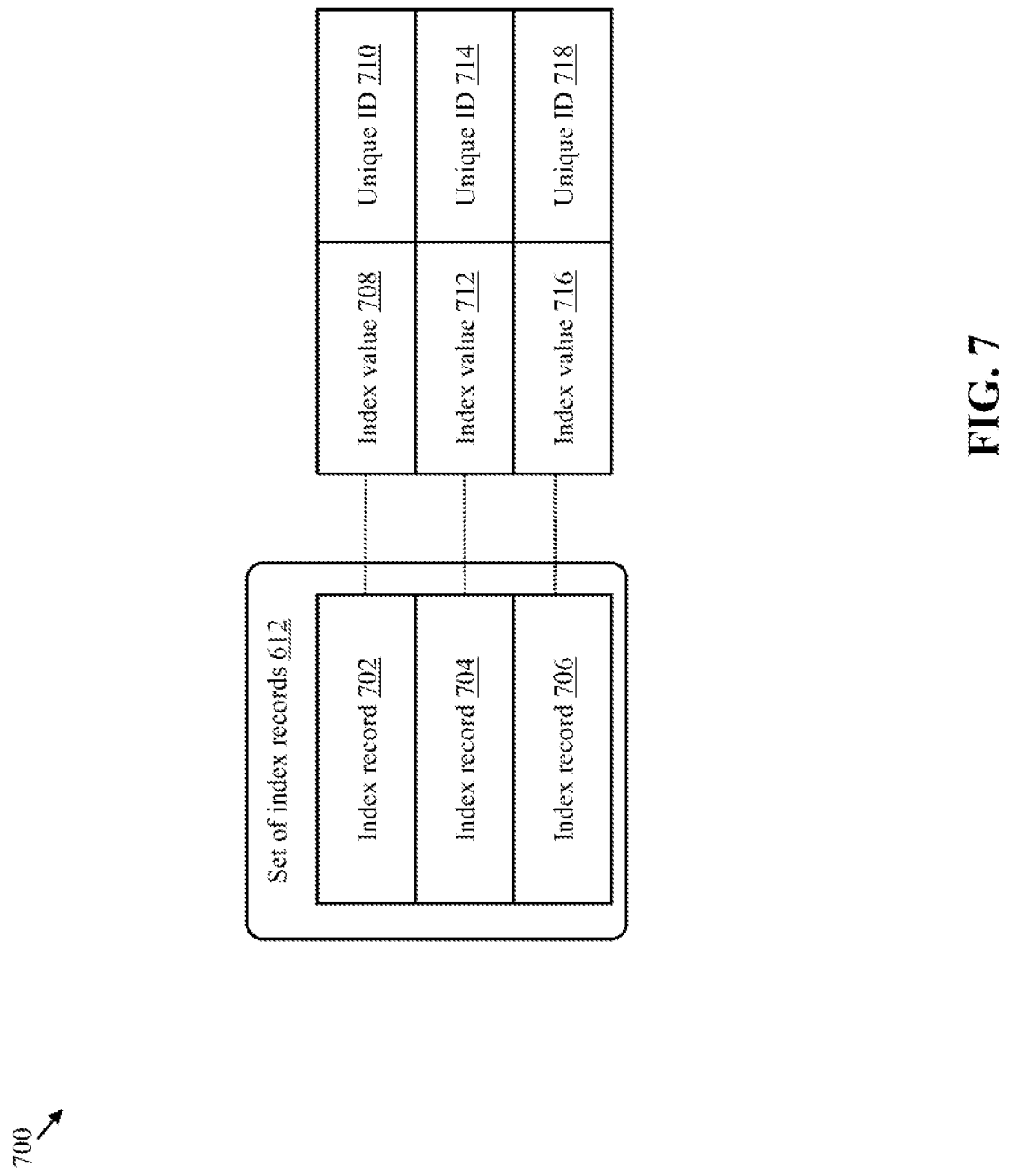
FIG. 7 is a block diagram that illustrates a set of index records of the index node, in accordance with an embodiment of the present disclosure.

FIG. 7 is a block diagram 700 that illustrates the set of index records 612 of the index node 602, in accordance with an embodiment of the present disclosure. The set of index records 612 is associated with the node template 304. It is assumed that the node template 304 is associated with a first node instance (such as the node instance 306), a second node instance (not shown), and a third node instance (not shown) of the node template 304. When the node template 304 has three node instances, the set of index records 612 associated with the node template 304 includes index records 702, 704, and 706 for the first, second, and third node instances, respectively.

The index record 702 includes an index value 708 derived from one or more attribute instances of the first node instance, and a unique ID 710 of the first node instance. The index value 708 corresponds to one or more values of a set of attribute instances (such as the set of attribute instances 346) of the first node instance based on the key 630. Similarly, the index record 704 includes an index value 712 derived from one or more attribute instances of the second node instance, and a unique ID 714. The index value 712 corresponds to one or more values of a set of attribute instances of the second node instance based on the key 630. Further, the unique ID 714 is associated with the second node instance. Additionally, the index record 706 includes an index value 716 derived from one or more attribute instances of the third node instance and a unique ID 718. The index value 716 corresponds to one or more values of a set of attribute instances of the third node instance based on the key 630. Further, the unique ID 718 is associated with the third node instance. The utilization of the set of index records 612 for implementing indexing in the executable graph-based model 100 is described in conjunction with FIGS. 9A and 9B.

Figure 8:
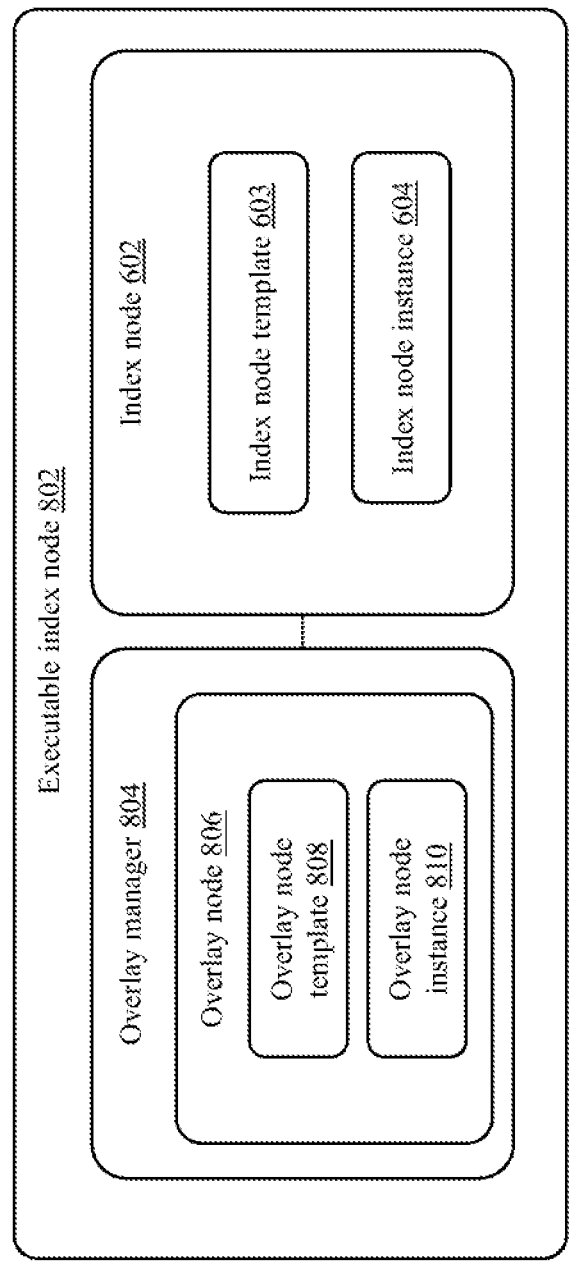
FIG. 8 is a block diagram that illustrates an executable index node within the executable graph-based model, in accordance with an embodiment of the present disclosure.

FIG. 8 is a block diagram 800 that illustrates an executable index node 802 within the executable graph-based model 100, in accordance with an embodiment of the present disclosure. Referring to FIG. 8, the executable index node 802 is shown to include the index node 602 and an overlay manager 804. The index node 602 includes the index node template 603 and the index node instance 604. The index node template 603 comprises a predetermined node structure. Further, the index node template 603 defines one or more rules that govern the generation of the index node instance 604. The index node instance 604 is an implementation of the index node template 603. In other words, the index node instance 604 is generated based on the predetermined node structure and the one or more rules of the index node template 603. The index node template 603 cannot be modified during the execution but may be modified during offline mode or at rest. During execution, only the index node instance 604 of the index node 602 may be modified.

The overlay manager 804 registers and maintains one or more overlay nodes (e.g., an overlay node 806). The executable index node 802 provides processing functionality (e.g., processing logic) to the index node 602 via one or more associated overlay nodes (for example, the overlay node 806). The overlay node 806 includes an overlay node template 808 and an overlay node instance 810. The overlay manager 804 and the overlay node 806 are similar to the overlay manager 404 and the run-time overlay node 406, respectively. In an example, the overlay node 806 may be one of an encryption overlay node, an obfuscation overlay node, a message handler overlay node, and a message publisher overlay node. Because an index node template and an index node instance are itself a node template and a node instance, respectively, all functionality of a node template and a node instance described in relation to the base run-time node 302 is thus applicable to an index node. Thus, an index node may be indexed in the executable graph-based model. Further, the executable index node 802 may be stored, loaded, and unloaded in the executable graph-based model 100 similar to the executable run-time node 402 that is described in FIG. 5.

Figure 9A:
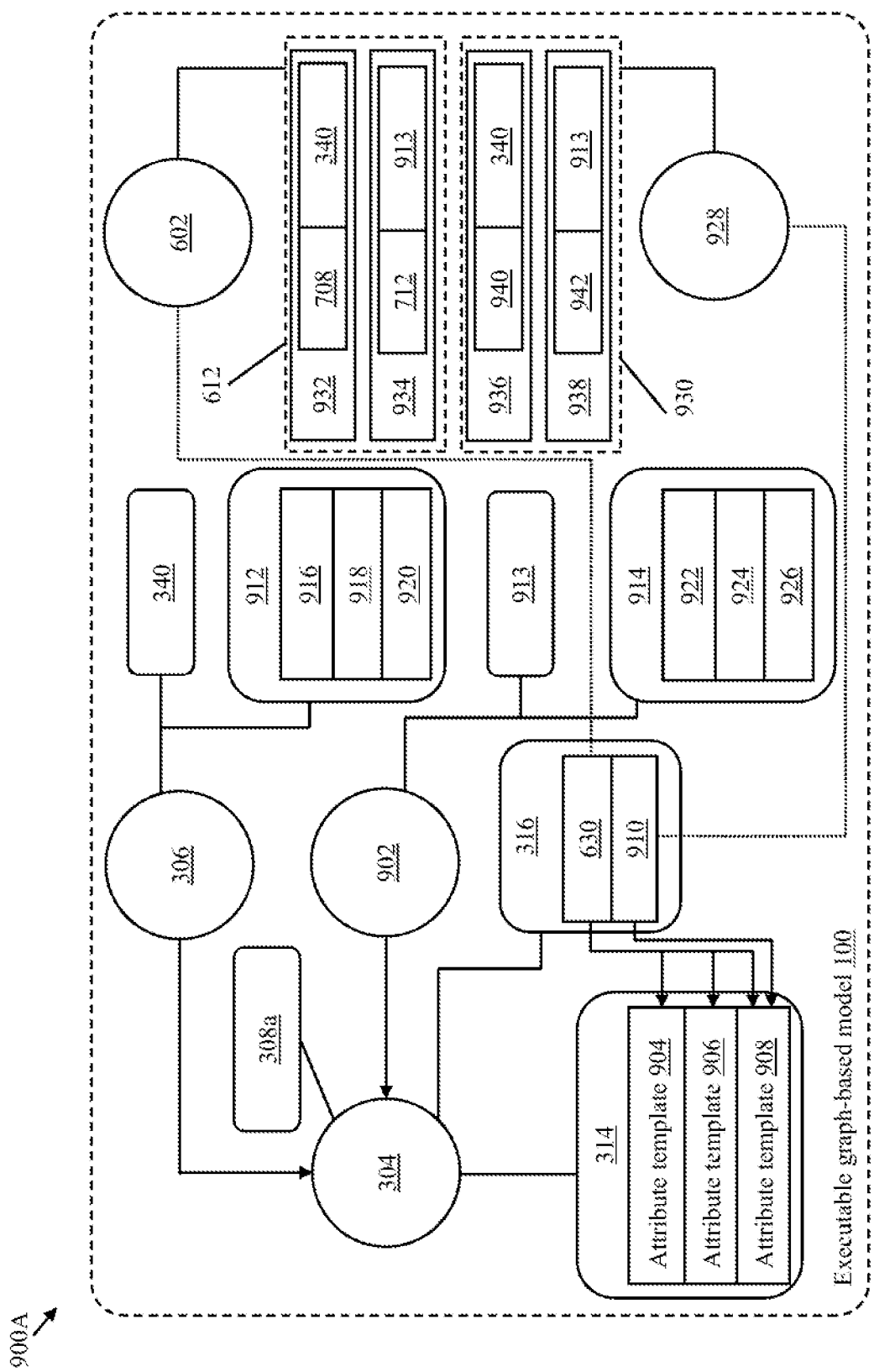
FIGS. 9A and 9B are schematic diagrams that, collectively, illustrate an implementation of indexing in the executable graph-based model, in accordance with an embodiment of the present disclosure.
Figure 9B:
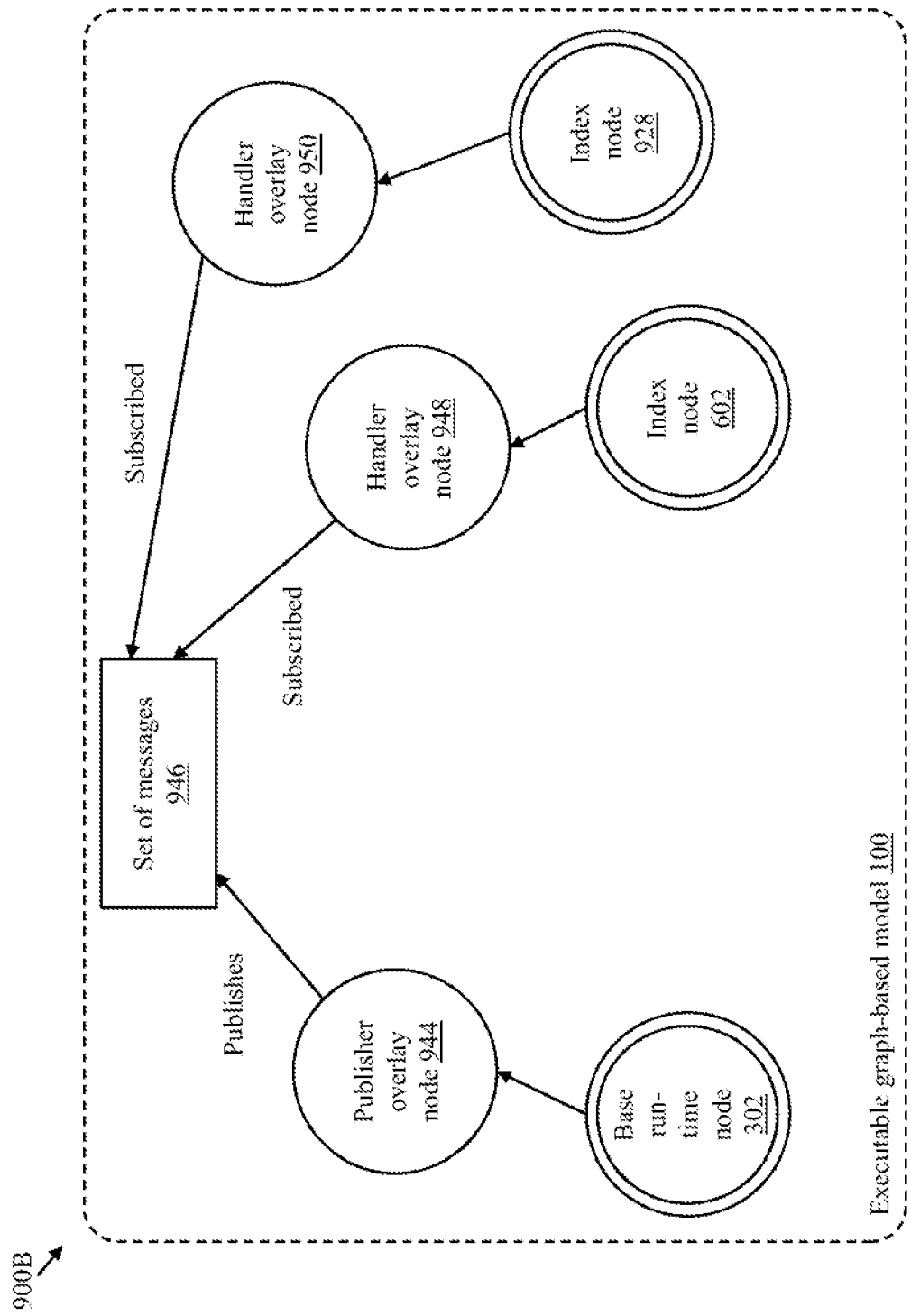

FIGS. 9A and 9B are schematic diagrams 900A and 900B that, collectively, illustrate an implementation of indexing in the executable graph-based model 100, in accordance with an embodiment of the present disclosure. Referring to FIG. 9A, the executable graph-based model 100 includes the node template 304, the node instance 306, and a node instance 902. For the sake of brevity, it is assumed that the node template 304 is a node template with the vertex node type template 334, and the node instances 306 and 902 are node instances with the vertex node type instance 352. Thus, the node template 304, the node instance 306, and the node instance 902 are hereinafter referred to as "the vertex node template 304", "the vertex node instance 306", and "the vertex node instance 902", respectively.

The vertex node instance 902 is an implementation of the vertex node template 304. The structure of the vertex node instance 902 is similar to the structure of the vertex node instance 306 that is illustrated in FIG. 3. The vertex node template 304 includes the unique ID 308*a*, the set of attribute templates 314, and the set of keys 316. The set of attribute templates 314 includes attribute templates 904, 906, and 908, whereas the set of keys includes keys 630 and 910. The key 630 is defined based on a combination/concatenation of the attribute templates 908, 904, and 906, and the key 910 is defined based on the attribute template 908. In an example, the attribute template 904 corresponds to 'First name', the attribute template 906 corresponds to 'Middle name', and the attribute template 908 corresponds to 'Last name'. In such an example, the key 630 corresponds to 'Last name First name Middle name' and the key 910 corresponds to 'Last name'.

The vertex node instance 306 includes the unique ID 340 and a set of attribute instance values 912 associated with the set of attribute instances 346. Similarly, the vertex node instance 902 includes a unique ID 913 and a set of attribute instance values 914. The set of attribute instance values 912 includes attribute instance values 916, 918, and 920, whereas the set of attribute instance values 914 includes attribute instance values 922, 924, and 926. In an example, the attribute instance values 916, 918, and 920 correspond to 'Peter', 'Jone', and 'White', respectively. Further, the attribute instance values 922, 924, and 926 correspond to 'Sandra', 'Apple', and 'Foster', respectively.

The executable graph-based model 100 is further shown to include the index node 602 and an index node 928. Each of the index node 602 and the index node 928 corresponds to a run-time index node. The index nodes 602 and 928 are associated with the vertex node template 304. In particular, the index node 602 is associated with the key 630 and the index node 928 is associated with the key 910. The index node 602 includes the set of index records 612 and the index node 928 includes a set of index records 930. The index node 602 and the index node 928 facilitate the indexing of vertex node instances (such as the vertex node instances 306 and 902) that are associated with the vertex node template 304.

Although it is described that the set of keys 316 is defined based on the set of attribute templates 314, the scope of the present disclosure is not limited to it. In other embodiments, the set of keys 316 may be defined based on one of the metadata 318 and the set of labels 308*f*, without deviating from the scope of the present disclosure. The set of attribute templates 314, the metadata 318, and the set of labels 308*f* may constitute a set of value templates. Further, values associated with the set of attribute instances 346, the metadata 348, and the set of labels 308*f* may constitute a set of node instance values. Thus, each node template includes a set of value templates such that for each node template, each associated node instance includes a set of node instance values that is associated with the set of value templates. Further, each key associated with the node template is defined based on one or more value templates of the set of value templates. For each node template, each associated index node is linked with a key, and for each index record of the corresponding index node, the node instance values, from which the associated index value is derived, are identified from the set of node instance values of the corresponding node instance based on the one or more value templates that define the key associated with the corresponding index node, respectively.

Initially, the executable graph-based model 100 includes only the vertex node template 304. At that time instance, the stimuli management module 212 may receive a first stimulus. Further, the stimuli management module 212, in conjunction with the context module 210, may identify that the stimulus is directed to creation/instantiation of the vertex node instances 306 and 902 for the vertex node template 304. Further, the controller module 206, in conjunction with the templating module 222, may be configured to create/instantiate the vertex node instances 306 and 902 in the executable graph-based model 100. Further, the controller module 206, in conjunction with the index management module 224, creates the index nodes 602 and 928 as the node template 304 includes the set of keys 316. The controller module 206, in conjunction with the index management module 224, further creates the set of index records 612 and 930 in the index nodes 602 and 928, respectively.

In the example illustration of FIG. 9A, the set of index records 612 includes index records 932 and 934, whereas the set of index records 930 includes index records 936 and 938. The index records 932 and 934 are associated with the vertex node instances 306 and 902, respectively. Further, the index record 932 includes the index value 708 and the unique ID 340 of the vertex node instance 306, whereas the index record 934 includes the index value 712 and the unique ID 913 of the vertex node instance 902. Similarly, the index records 936 and 938 are associated with the vertex node instances 306 and 902, respectively, with the index record 936 including an index value 940 and the unique ID 340 of the vertex node instance 306, and the index record 938 including an index value 942 and the unique ID 913 of the vertex node instance 902.

The index value 708 corresponds to a concatenation of the attribute instance values 920, 916, and 918. Further, the index value 712 corresponds to the attribute instance values 926, 922, and 924. In an example, the index values 708 and 712 are 'White Peter Jone' and 'Foster Sandra Apple', respectively (e.g., as the attribute instance values 916, 918, 920, 922, 924, and 926 are 'Peter', 'Jone', 'White', 'Sandra', 'Apple', and 'Foster', respectively). Further, the index value 940 corresponds to the attribute instance value 920, whereas the index value 942 corresponds to the attribute instance value 926. Thus, the index values 940 and 942 are 'White' and 'Foster', respectively (e.g., as the attribute instance values 920 and 926 are 'White' and 'Foster', respectively).

Upon the generation of the set of index records 612 and 930, the stimuli management module 212 may further receive a second stimulus (such as the stimulus 232). The second stimulus may refer to one of a query and a command. When the second stimulus corresponds to the query, the execution of an operation associated with the second stimulus corresponds to retrieval of data from associated one or more node instances, whereas when the second stimulus corresponds to the command, the execution of the operation associated with the second stimulus corresponds to mutation of each of associated one or more node instances. For the sake of brevity, it is assumed that the second stimulus is a query. A context of the second stimulus may be indicative of retrieval of node instances associated with a reference index value. In an example, the reference index value corresponds to the index value 940. Further, the stimuli management module 212, in conjunction with the context module 210, identifies that the context of the second stimulus is indicative of the reference index value, i.e., the index value 940 (for example, 'White'). The controller module 206, in conjunction with the index management module 224, further identifies the index record 936 that includes the reference index value (i.e., the index value 940) in the executable graph-based model 100. In particular, the controller module 206, in conjunction with the index management module 224, traverses through one or more of the index records present in the executable graph-based model 100 to identify the index record 936. The identified index record 936 is associated with the index node 928, where the index node 928 includes the identified index record 936.

In an embodiment, the context of the second stimulus may be further indicative of the attribute template 908 that is associated with the index value 940. In such an embodiment, the stimuli management module 212, in conjunction with the context module 210, identifies that the context of the second stimulus is indicative of the index value 940 (for example, 'White') and the attribute template 908. Further, the controller module 206, in conjunction with the index management module 224, identifies the index node 928 in the executable graph-based model 100 based on the attribute template 908. In particular, the controller module 206, in conjunction with the index management module 224, traverses through one or more of the index nodes present in the executable graph-based model 100 to identify the index node 928. The index node 928 is identified as a result of the index node 928 including the attribute template 908 as an index value template (such as the index value template 610). The controller module 206, in conjunction with the index management module 224, further identifies the index record 936 that is associated with the index value 940 in the index node 928. In particular, the controller module 206, in conjunction with the index management module 224, traverses the set of index records 930 to identify the index record 936.

Upon the identification of the index record 936, the controller module 206, in conjunction with the index management module 224, further identifies the unique ID 340 that is mapped to the reference value (i.e., the index value 940) in the index record 936. The controller module 206 further identifies, in the executable graph-based model 100, the vertex node instance 306 that is associated with the unique ID 340. Further, the controller module 206 identifies the vertex node template 304 that is associated with the vertex node instance 306 based on the association therebetween, and executes an operation associated with the second stimulus based on the vertex node instance 306 and the vertex node template 304. The operation is executed based on the vertex node instance 306 and the vertex node template 304 as the vertex node instance 306 and the vertex node template 304 constitute the base run-time node 302.

In an example, the second stimulus may be indicative of retrieval of an address associated with the index value 940. In such an example, the address associated with the index value is not present in the vertex node instance 306, instead, the address is present in another vertex node instance that is coupled to the vertex node instance 306 via an edge node instance and an address role. Thus, the execution of the operation associated with the second stimulus includes querying the address from the associated vertex node instance based on the edge node instance and address role associated with the vertex node instance 306 upon the identification of the vertex node instance 306 based on the index value 940.

Although it is described that the reference index value is included in a single index record, the scope of the present disclosure is not limited to it. In other embodiments, the reference index value may be present in two or more index records. In such embodiments, two or more index records are identified in the executable graph-based model 100. Further, controller module 206 identifies two or node instances having two or more unique IDs associated with the identified two or more index records, respectively, to execute an operation associated therewith.

In an embodiment, the stimuli management module 212 may further receive a third stimulus. The third stimulus is another command that indicates modification of an attribute instance value (for example, 'White') of a vertex node instance with the index value 940 (for example, 'White'). The context of the third stimulus may be further indicative of the attribute template 908 that is associated with the index value 940. The stimuli management module 212, in conjunction with the context module 210, identifies the index node 928 in the executable graph-based model 100 based on the context of the third stimulus in a similar manner as described above. Further, the controller module 206, in conjunction with the index management module 224, identifies the index record 936 that stores the index value 940. Further, the controller module 206, in conjunction with the index management module 224, identifies the unique ID 340 that is mapped to the index value 940 in the index record 936. The controller module 206 further identifies the vertex node instance 306 that is associated with the unique ID 340 in the executable graph-based model 100, and the vertex node template 304 associated therewith. Further, the controller module 206 executes an operation associated with the third stimulus based on the vertex node instance 306 and the vertex node template 304.

The controller module 206 thus modifies the attribute instance value 920 of the vertex node instance 306 during the execution of the operation associated with the third stimulus. In an example, 'White' is modified to 'Brown'. As the attribute instance value 920 is modified to a new value, the controller module 206, in conjunction with the index management module 224, modifies the index value 940 to reflect the change. Further, the modification of the vertex node instance 306 results in the modification of the associated index record (such as the index record 936) in the index node 928.

In another embodiment, the stimuli management module 212 may further receive a fourth stimulus. The fourth stimulus is yet another command. Further, the fourth stimulus indicates deletion of a vertex node instance with the index value 712 (for example, 'Foster Sandra Apple'). The context of the fourth stimulus may be further indicative of the attribute templates 908, 904, and 906 that are associated with the index value 712. The controller module 206, in conjunction with the index management module 224, identifies the index node 602 in the executable graph-based model 100 based on the context of the fourth stimulus in a similar manner as described above. Further, the controller module 206, in conjunction with the index management module 224, identifies the index record 934 that stores the index value 712. The controller module 206, in conjunction with the index management module 224, further identifies the unique ID 913 that is mapped to the index value 712 in the index record 934. The controller module 206 further identifies the vertex node instance 902 that is associated with the unique ID 913 in the executable graph-based model 100 and the vertex node template 304 associated therewith. Further, the controller module 206 executes an operation associated with the fourth stimulus based on the vertex node instance 902 and the vertex node template 304.

The controller module 206 thus deletes the vertex node instance 902 from the overlay system 202 during the execution of the operation associated with the fourth stimulus. As the vertex node instance 902 is deleted from the overlay system 202, the controller module 206 in conjunction with the index management module 224 deletes the index records 934 and 938. Thus, the deletion of the vertex node instance 902 results in the deletion of the associated index records (such as the index records 934 and 938).

Thus, for each node template, the index records of each associated index node are mutated based on various stimuli. The mutation may correspond to creation of an index record, modification of an index record, and/or deletion of an index record. In the aforementioned example, the first stimulus results in the creation of the one or more index records (e.g., the index records 932, 934, 936, and 938), the third stimulus results in the modification of the one or more index records (e.g., the index record 936), and the fourth stimulus results in the deletion of the one or more index records (e.g., the index records 934 and 938). Thus, the first stimulus may precede (e.g., may be received prior to) the second stimulus, the third stimulus may precede or follow the second stimulus, and the fourth stimulus may follow the second stimulus.

In an embodiment, sorting of index records (such as the set of index records 612) is based on index values of the corresponding index records. For example, the index records may be sorted in one of an alphabetical order, an increasing order, a decreasing order, a numerical order, and an alphanumerical order. In another embodiment, the sorting of index records is based on the time of creation of index records. In yet another embodiment, the sorting of index records is customizable. Further, traversal of the index records may be performed using a searching algorithm based on the sorting technique. Examples of the searching algorithm may include a balanced tree, Adelson-Velsky and Landis (AVL) tree, a ternary search tree, or the like. Additionally, the index records may be rearranged based on the mutation to associated vertex node instances.

The mutation of the one or more index records that is described in the aforementioned description is a result of communication between the one or more index nodes and the one or more node instances associated therewith. The communication between the one or more node instances and the one or more index nodes may be by way of messages. Each node instance in the executable graph-based model 100 is associated with a publisher overlay node that is configured to generate and publish a set of messages upon any mutation to the corresponding node instance, where each message is indicative of the corresponding mutation. Further, each index node in the executable graph-based model is associated with a handler overlay node that is configured to subscribe to the set of messages published by the one or more associated node instances, process the set of messages, and mutate a set of index records associated therewith. An example of such communication is explained in FIG. 9B.

Referring to FIG. 9B, communication between base run-time node 302, the index node 602, and the index node 928 in the executable graph-based model 100 is illustrated. Base run-time node 302 includes the vertex node template 304 and the vertex node instance 306. As shown, the executable graph-based model 100 includes a publisher overlay node 944 and handler overlay nodes 948 and 950. Each of the publisher overlay node 944 and the handler overlay nodes 948 and 950 corresponds to a run-time node. The publisher overlay node 944 is associated with base run-time node 302. In other words, the publisher overlay node 944 is an overlay of base run-time node 302. The publisher overlay node 944 is configured to generate and publish a set of messages 946 upon any mutation to the vertex node instance 306. The mutation may refer to one of creation of the vertex node instance 306, modification of the vertex node instance 306, and deletion of the vertex node instance 306. Further, the handler overlay nodes 948 and 950 are associated with the index nodes 602 and 928, respectively. In other words, the handler overlay nodes 948 and 950 are overlays of the index nodes 602 and 928, respectively.

Base run-time node 302 is represented in the executable graph-based model 100 by way of two concentric circles, with the inner circle representing base run-time node 302 and the outer circle indicating the presence of an overlay node (e.g., the publisher overlay node 944) for extending the functionalities of base run-time node 302. In such a scenario, the association of base run-time node 302 with the publisher overlay node 944 is represented by an arrow linking the outer circle of base run-time node 302 to the publisher overlay node 944. Similarly, the publisher overlay node 944 is represented in the executable graph-based model 100 by way of a single circle as it is not extended further using overlays. The index nodes 602 and 928 are represented similarly to base run-time node 302. Further, the set of messages 946 is represented as a rectangle in the executable graph-based model 100.

The handler overlay node 948 is configured to subscribe to the set of messages 946, process the set of messages 946, and mutate one of the index records 932 and 934 based on the processing of at least one message of the set of messages 946. Similarly, the handler overlay node 950 is configured to subscribe to the set of messages 946, process the set of messages 946, and mutate one of the index records 936 and 938 based on the processing of at least one message of the set of messages 946.

As the vertex node template 304 includes two keys, the set of messages 946 includes a first message and a second message. The first message is associated with the key 630 and the second message is associated with the key 910. The first message includes an indication that the vertex node instance 306 is mutated. The first message further includes the unique ID 308*a* of the vertex node template 304, the unique ID 340 of the vertex node instance, the attribute templates 908, 904, and 906, and the attribute instance values 920, 916, and 918. Similarly, the second message includes the indication that the vertex node instance 306 is mutated. The second message further includes the unique ID 308*a* of the vertex node template 304, the unique ID 340 of the vertex node instance, the attribute template 908, and the attribute instance value 920. The handler overlay node 948 receives the set of messages 946. Further, the handler overlay node 948 is configured to identify that the first message, from the set of messages 946, is associated with the index node 602 based on the unique ID 308*a* of the vertex node template 304 and the attribute templates 908, 904, and 906 included in the first message, and mutate the index record 932 based on the first message. Similarly, the handler overlay node 950 receives the set of messages 946 and identifies that the second message is associated with the index node 928. Further, the handler overlay node 950 mutates the index record 936 based on the second message. In an embodiment, the handler overlay nodes 948 and 950 may receive a third message (e.g., a combination of the first message and the second message) of the first set of messages 946 instead of the first message and the second message.

When the mutation refers to the creation of the vertex node instance 306, the first message is indicative of the creation of the vertex node instance 306. As a result, the handler overlay node 948 creates the index record 932 associated with the vertex node instance 306 in the index node 602 based on the processing of the first message. Thus, the index record 932 includes the unique ID 340 of the vertex node instance 306, and the index value 708 based on the attribute instance values 920, 916, and 918. Similarly, the second message is indicative of the creation of the vertex node instance 306. As a result, the handler overlay node 950 creates the index record 936 associated with the vertex node instance 306 in the index node 928. Thus, the index record 936 includes the unique ID 340 of the vertex node instance 306, and the index value 940 based on the attribute instance value 920.

When the mutation refers to the modification of the vertex node instance 306, the first message is indicative of the modification of the vertex node instance 306 and further includes a modified index value. As a result, the handler overlay node 948 modifies the index record 932 associated with the vertex node instance 306 in the index node 602 based on the first message. In an example, the index value 708 that corresponds to 'White' is modified to 'Brown' based on the first message. Similarly, the second message is indicative of the modification of the vertex node instance 306 and further includes a modified index value. As a result, the handler overlay node 950 modifies the index record 936 in the index node 928 based on the second message.

When the mutation refers to the deletion of the vertex node instance 306, the first message is indicative of the deletion of the vertex node instance 306. As a result, the handler overlay node 948 deletes the index record 932 associated with the vertex node instance 306 from the index node 602 based on the first message. Similarly, the second message is indicative of the deletion of the vertex node instance 306. As a result, the handler overlay node 950 deletes the index record 936 associated with the vertex node instance 306 from the index node 928 based on the second message. Thus, the index record 932 is mutated based on the first message, and the index record 936 is mutated based on the second message.

In an embodiment, another run-time node that includes the vertex node template 304 and the vertex node instance 902 may communicate with the index node 602 and the index node 928 in a similar manner as described above, with the communication therebetween resulting in the mutation of the index records 934 and 938.

In the present disclosure, data and processing logic are stored separately to ensure segregation and independent control thereof. Therefore, prior to the execution of the operation associated with the first stimulus, the data management module 238, in conjunction with the overlay management module 214 and the index management module 224, may be configured to determine that the vertex node template 304 that is required for executing the operation associated with the first stimulus, is currently not loaded in the executable graph-based model 100. Thus, the data management module 238, in conjunction with the overlay management module 214, is configured to load the vertex node template 304, in the executable graph-based model 100, with corresponding data and processing logic. Similarly, prior to the execution of the operation associated with the second stimulus, the data management module 238, in conjunction with the overlay management module 214 and the index management module 224, may be configured to load, in the executable graph-based model 100 with corresponding data and processing logic, at least one of the index node 928, the vertex node instance 306, and the vertex node template 304 that are to be utilized for processing of the second stimulus. Additionally, prior to the execution of the operation associated with the third stimulus, the data management module 238, in conjunction with the overlay management module 214 and the index management module 224, may be configured to load, in the executable graph-based model 100 with corresponding data and processing logic, at least one of the index node 602, the vertex node instance 306, and the vertex node template 304. Similarly, prior to the execution of the operation associated with the fourth stimulus, the data management module 238, in conjunction with the overlay management module 214 and the index management module 224, may be configured to load, in the executable graph-based model 100 with corresponding data and processing logic, at least one of the index node 602, the vertex node instance 902, and the vertex node template 304. In other words, prior to execution of each operation, all the required nodes that are not loaded, are loaded in the executable graph-based model 100 with corresponding data and processing logic. In an embodiment, one or more overlay nodes (such as handler overlay nodes, publisher overlay nodes, encryption overlay nodes, obfuscation overlay nodes, or the like) that are associated with one or more of the vertex node template 304, the vertex node instance 306, the vertex node instance 902, index node 602, and the index node 928, may be loaded in the executable graph-based model prior to execution of a corresponding operation. The loading operation may be performed in the manner described in FIG. 5.

Although it is described that the executable graph-based model 100 includes one vertex node template (e.g., the vertex node template 304), two vertex node instances (e.g., the vertex node instances 306 and 902), two index nodes (e.g., the index nodes 602 and 928), one publisher overlay node (e.g., the publisher overlay node 944), and two handler overlay nodes (e.g., the handler overlay nodes 948 and 950), the scope of the present disclosure is not limited to it. In other embodiments, the executable graph-based model 100 may include more than one node template, more than two node instances, more than two index nodes, more than one publisher overlay node, and more than two handler overlay nodes.

Thus, the executable graph-based model 100 may include a plurality of node templates, a plurality of node instances, a plurality of index nodes, a plurality of publisher overlay nodes, and a plurality of handler overlay nodes. Further, each node template of the plurality of node templates may correspond to one of a group consisting of a hyper-edge node template (i.e., a node template with the edge node type template 336), a vertex node template (i.e., a node template with the vertex node type template 334), and an overlay node template (i.e., a node template with the overlay node type template 338). Also, each node instance of the plurality of node instances may correspond to one of a group consisting of a hyper-edge node instance (i.e., a node instance with the edge node type instance 354), a vertex node instance (i.e., a node instance with the vertex node type instance 352), and an overlay node instance (i.e., a node instance with the overlay node type instance 356). In such embodiments, each node template (e.g., the vertex node template 304) is associated with a set of node instances (such as the vertex node instances 306 and 902), and a set of index nodes (such as the index nodes 602 and 928). Also, each index node of the plurality of index nodes may include an index template (e.g., the index node template 603) and an index instance (e.g., the index node instance 604). The index template corresponds to a predefined node structure, and the index instance corresponds to an implementation of the corresponding index template.

Additionally, each index node of the set of index nodes is associated with the set of node instances. Further, each index node of the set of index nodes includes a set of index records such that each index record includes a unique ID of a corresponding node instance of the set of node instances and an index value associated therewith. Upon the reception of the second stimulus whose context is indicative of the reference index value, the controller module 206 in conjunction with the index management module 224, identifies one or index records that include the reference index value. Further, the controller module 206 identifies one or more node instances from the plurality of node instances having one or more unique IDs associated with the identified one or more index records. The identified one or more index records are associated with one or more index nodes, of the plurality of index nodes, such that each index node, of the one or more index nodes, includes at least one index record of the identified one or more index records. The controller module 206 further executes an operation associated with the second stimulus based on the identified one or more node instances and one or more node templates associated with the identified one or more node instances.

Thus, the node template 304, of the plurality of node templates, is associated with a first set of node instances of the plurality of node instances and a first set of index nodes of the plurality of index nodes. The set of node instances includes the node instances 306 and 902. Further, the first set of index nodes includes the index nodes 602 and 928. Additionally, the set of index records, of each index node of the first set of index nodes, is mutated based on a first set of stimuli. The first set of stimuli includes the first stimulus, the third stimulus, and the fourth stimulus. Additionally, the mutation of the set of index records corresponds to at least one of a group consisting of the creation of at least one index of the set of index records, the modification of at least one index record of the set of index records, and the deletion of at least one index record of the set of index records.

Although it is described that the index values correspond to associated attribute instance values, the scope of the present disclosure is not limited to it. In other embodiments, the index values may correspond to one of hashed attribute instance values, encrypted attribute instance values, or the like, based on an overlay node associated with the corresponding index node.

In an embodiment, the executable graph-based model 100 may include a first plane and a second plane. In such an embodiment, the first plane includes the plurality of index nodes and the second plane includes the plurality of node templates and the plurality of node instances. Thus, the first plane with the plurality of index nodes may be loaded to the executable graph-based model whenever required.

Figure 10A:
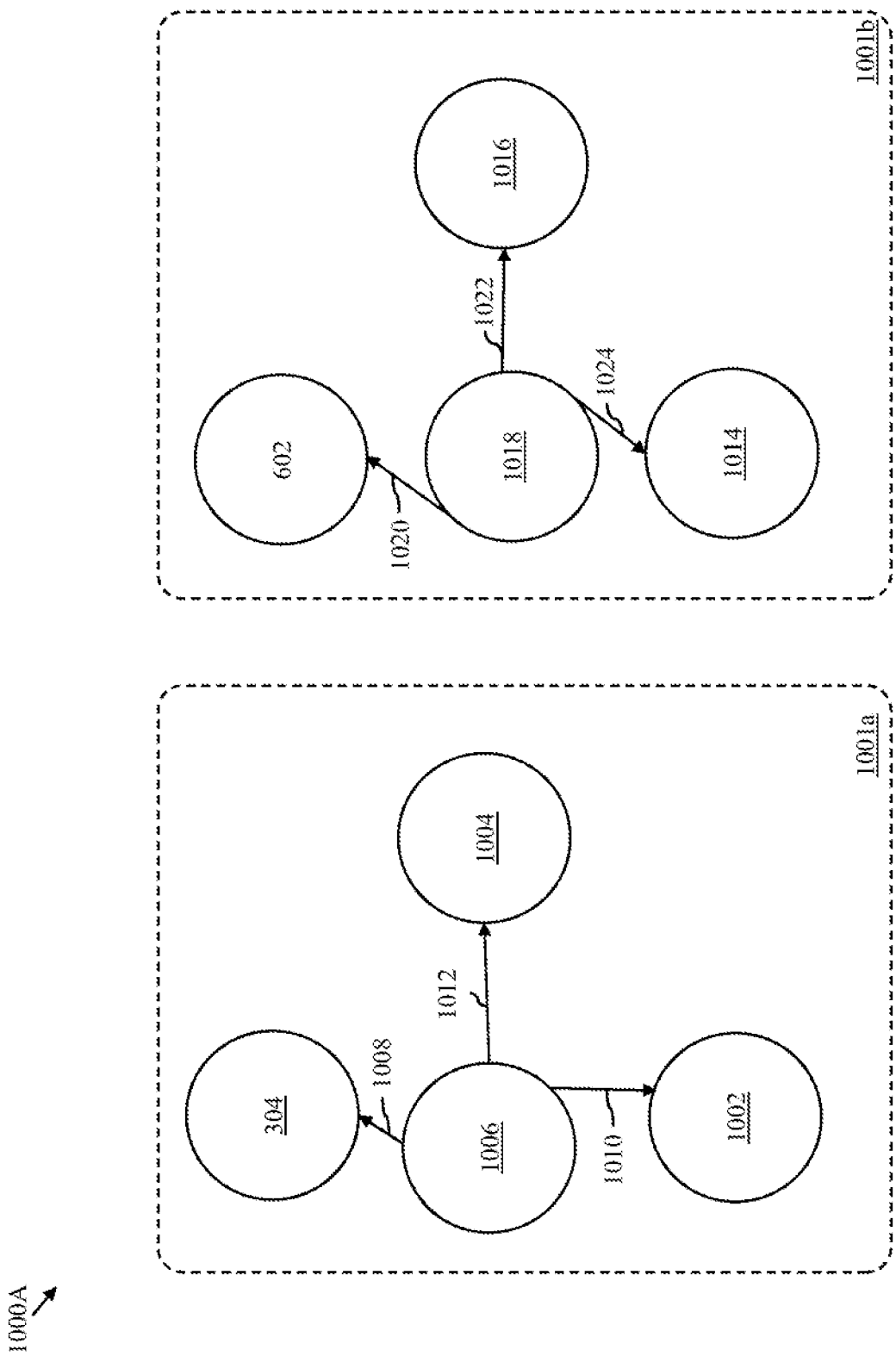
FIGS. 10A and 10B are schematic diagrams that, collectively, illustrate a composite index node in the executable graph-based model, in accordance with an embodiment of the present disclosure.
Figure 10B:
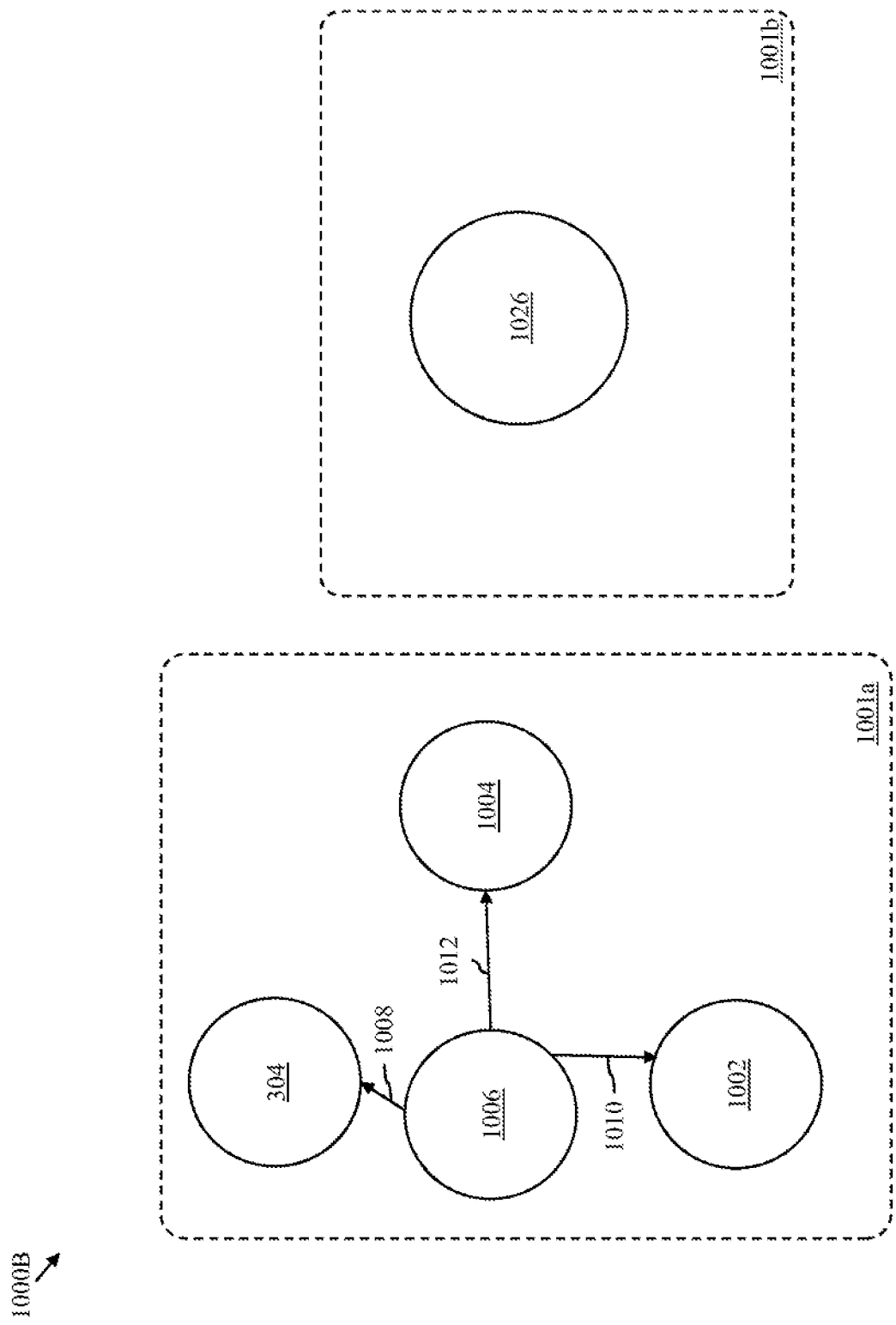

FIGS. 10A and 10B are schematic diagrams 1000A and 1000B that, collectively, illustrate a composite index node in the executable graph-based model 100, in accordance with an embodiment of the present disclosure. Referring to FIG. 10A, a first plane of the executable graph-based model 100 and a second plane of the executable graph-based model 100 are shown. The first and second planes of the executable graph-based model 100 are hereinafter referred to as "the first plane 1001*a*" and "the second plane 1001*b*", respectively. The first plane 1001*a* includes the plurality of node templates (e.g., the node template 304, a node template 1002, a node template 1004, and a node template 1006). Each of the node templates 304, 1002, and 1004 corresponds to a vertex node template, and the node template 1006 corresponds to a hyper-edge node template. The node template 1006 couples the node templates 304, 1002, and 1004 with each other. The node templates 304, 1002, and 1004 are hereinafter referred to as "the vertex node template 304", "the vertex node template 1002", and "the vertex node template 1004", respectively. Additionally, the node template 1006 is hereinafter referred to as "the edge node template 1006". Further, role nodes 1008 and 1010 collectively define a connective relationship between the vertex node template 304 and the vertex node template 1002. Similarly, the role node 1010 and a role node 1012 collectively define a connective relationship between the vertex node template 1004 and the vertex node template 1002. Similarly, the role nodes 1008 and 1012 collectively define a connective relationship between the vertex node template 304 and the vertex node template 1004.

The second plane 1001*b* includes the index node 602 and index nodes 1014, 1016, and 1018. The index node 602 is associated with the vertex node template 304 as described in conjunction with FIGS. 9A and 9B. The index nodes 1014, 1016, and 1018 are associated with the vertex node templates 1002, 1004, and the edge node template 1006, respectively, in a manner that is similar to the association of the index node 602 with the vertex node template 304. The index nodes 602, 1014, 1016, and 1018 may constitute a composite set of index nodes as the index nodes 602, 1014, 1016, and 1018 are coupled to each other. Thus, the vertex node templates 304, 1002, and 1004, and the edge node template 1006 are associated with the composite set of index nodes of the plurality of index nodes. Further, the index node 602, the index node 1014, and the index node 1016 are of the vertex node type and the index node 1018 is of the edge node type. Thus, the index node 602, the index node 1014, and the index node 1016 are connected to each other by way of the index node 1018 and role nodes 1020, 1022, and 1024. The structure and functionalities of the index nodes 1014, 1016, and 1018 are similar to that of the index node 602 as described in conjunction with FIGS. 6 and 7.

Now referring to FIG. 10B, a composite index node 1026 is shown. The composite index node 1026 is a combination of the index nodes 602, 1014, 1016, and 1018. The composite index node 1026 is configured to maintain index records associated with the vertex node templates 304, 1002, and 1004, and the edge node template 1006. The index management module 224 may be configured to combine the index nodes 602, 1014, 1016, and 1018 to form the composite index node 1026 as the vertex node templates 304, 1002, and 1004 are connected to each other via the edge node template 1006. In other words, the index nodes 602, 1014, 1016, and 1018 are integrated into the composite index node 1026. The composite index node 1026 may include the index value template (such as the index value template 610) of each of the index nodes 602, 1014, 1016, and 1018. The composite index node 1026 may further include one or more index records associated with each of the vertex node templates 304, 1002, and 1004, and the edge node template 1006. The composite index node 1026 may further include a reference to each of the vertex node templates 304, 1002, and 1004. Each reference may indicate a role node between the corresponding vertex node template and the edge node template 1006, the corresponding vertex node template, and one or more attribute templates associated therewith. The integration of index nodes 602, 1014, 1016, and 1018 to form the composite index node 1026 optimizes the use of storage space in the overlay system 202.

Thus at least one index node of the plurality of index nodes is a composite index node (e.g., the composite index node 1026) that corresponds to a combination of the two or more index nodes (e.g., the index nodes 602, 1014, 1016, and 1018) based on associated two or more node templates (e.g., the vertex node templates 304, 1002, and 1004, and the edge node template 1006) being coupled to each other.

In an embodiment, the overlay system 202 may include another executable graph-based model. In such an embodiment, the index management module 224 may be configured to merge a first index node (such as the index node 602) from the executable graph-based model 100 and a second index node from the other executable graph-based model to form a combined index node. The combined index node includes index records of the two index nodes that are merged. The first index node and the second index node are merged when a first node template associated with the first index node and a second node template associated with the second index node are combined with each other. In other words, the merging of two executable graph-based models results in the merging of the index nodes associated therewith.

Figure 11A:
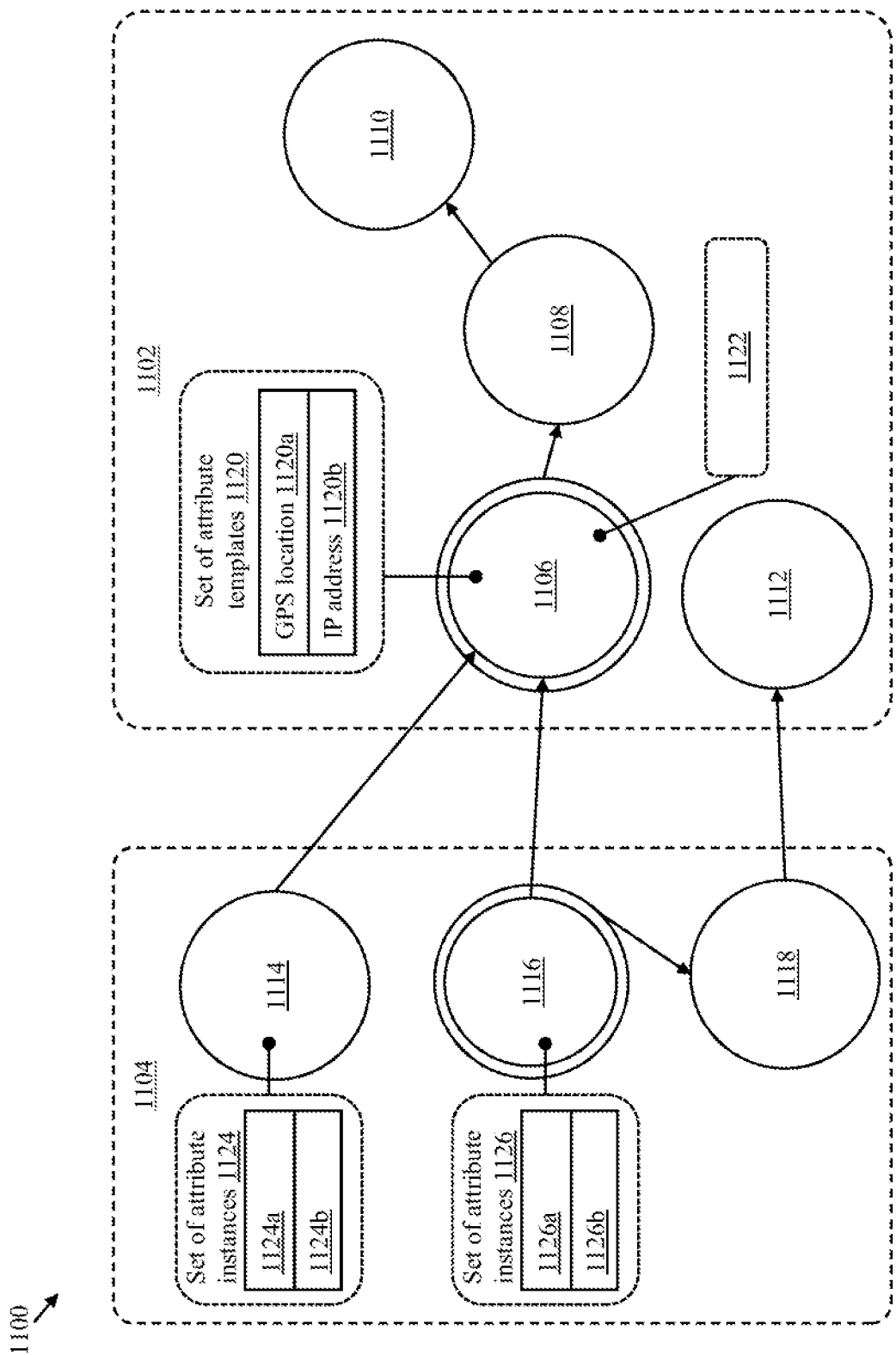
FIGS. 11A and 11B are schematic diagrams that, collectively, illustrate an example implementation of indexing in an executable graph-based soil moisture sensor model, in accordance with an embodiment of the present disclosure.
Figure 11B:
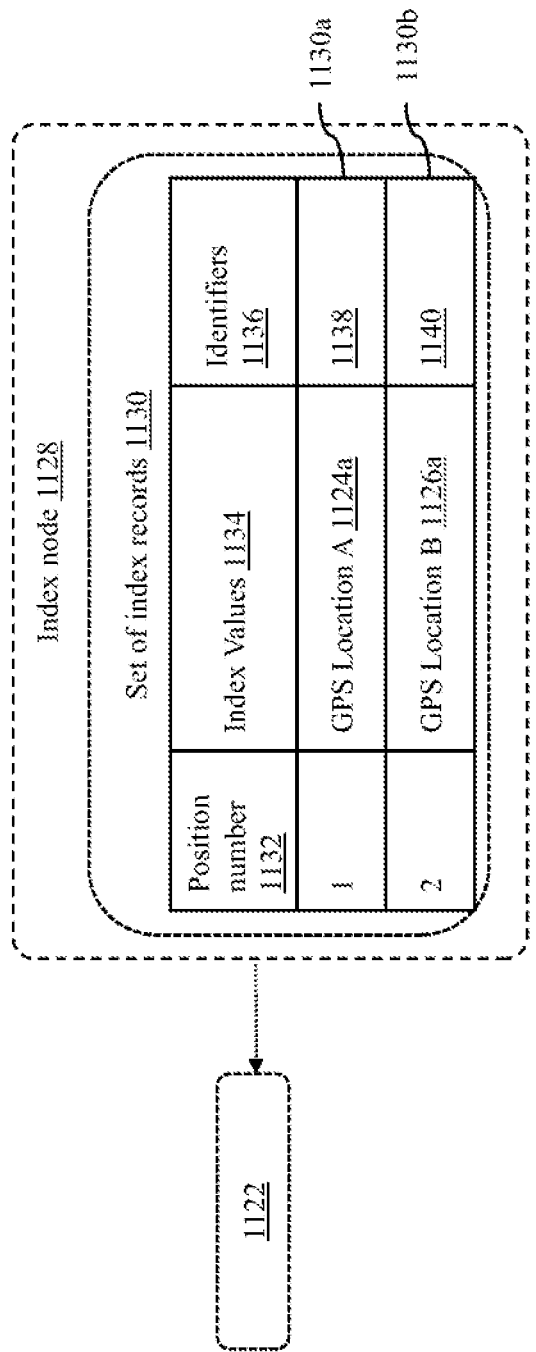

FIGS. 11A and 11B are schematic diagrams that, collectively, illustrate an example implementation of indexing in an executable graph-based soil moisture sensor model 1100, in accordance with an embodiment of the present disclosure. Referring to FIG. 11A, the executable graph-based soil moisture sensor model 1100 corresponds to an executable graph-based model generated for a soil moisture sensor of a soil sensor system, and is hereinafter referred to as the "soil moisture sensor model 1100". The soil moisture sensor model 1100 is included in the overlay system 202.

The soil moisture sensor model 1100 includes a template portion 1102 and an instance portion 1104. The template portion 1102 includes a sensor template 1106, a sensor interface instance 1108, a sensor interface template 1110, and a logging overlay template 1112. The sensor template 1106 is a node template (such as the node template 304). Further, the sensor interface instance 1108 is an overlay of the sensor template 1106 and is a specific implementation of the sensor interface template 1110. The instance portion 1104 includes a sensor instance 1114 and a sensor instance 1116. The sensor instance 1114 and the sensor instance 1116 correspond to node instances (such as the node instance 306) and are specific implementations of the sensor template 1106. The sensor instance 1116 is associated with a logging overlay instance 1118 which is an implementation of the logging overlay template 1112. The sensor template 1106 includes a set of attribute templates 1120 and a key 1122 that is defined based on the set of attribute templates 1120. The set of attribute templates 1120 includes a global positioning system (GPS) location 1120a and an internet protocol (IP) address 1120b as attribute templates. Further, the key 1122 is defined based on the GPS location 1120a. Thus, indexing for GPS location is implemented in the soil moisture sensor model 1100. The sensor instance 1114 includes a set of attribute instance values 1124 associated with the set of attribute templates 1120 of the sensor template 1106. Similarly, the sensor instance 1116 includes a set of attribute instance values 1126 associated with the set of attribute templates 1120 of the sensor template 1106.

The soil moisture sensor model 1100 shown in FIG. 11A corresponds to a portion of the soil moisture sensor system. More particularly, the soil moisture sensor model 1100 corresponds to the portion of the soil moisture sensor system related to interfacing with physical soil moisture sensors. The soil moisture sensor model 1100 is well suited for such agriculture applications due to the reusability and extensibility of the template structure as well as the reduction in latency provided by the integration of data and data processing logic within a single model.

The sensor template 1106 corresponds to a template for a soil moisture sensor. In other words, the sensor template 1106 comprises the common structure and data applicable to a specific type of soil moisture sensor (e.g., a specific model of soil moisture sensor). The sensor interface instance 1108 and the sensor interface template 1110 define processing logic operable to interface with a soil moisture sensor based on the set of attribute templates 1120 defined in the sensor template 1106. The sensor instances 1114 and 1116 correspond to specific implementations of the sensor template 1106 and are associated with two physical soil moisture sensors placed at a target area (such as agricultural land) within the real world where soil moisture needs to be monitored. The two physical soil moisture sensors are of the specific type represented by the sensor template 1106. The set of attribute instance values 1124 of the sensor instance 1114 defines values related to the specific soil moisture sensor associated with the sensor instance 1114. For example, the set of attribute templates 1120 may define attributes such as the GPS location 1120a and the IP address 1120b. Further, the set of attribute instance values 1124 of the sensor instance 1114 may thus specify values such as a GPS location 'A' 1124a and an IP address 'A' 1124b for these attributes which are specific to the soil moisture sensor associated with the sensor instance 1114. Similarly, the set of attribute instance values 1126 of the sensor instance 1116 may assign values such as a GPS location 'B' 1126a and an IP address 'B' 1126b for the set of attribute templates 1120 which are specific to the soil moisture sensor associated with the sensor instance 1116. In this way, the processing logic defined in the sensor interface template 1110 and/or the sensor interface instance 1108 is operable to interact with the requisite sensor by utilizing the values set in the set of attribute instance values 1124 or the set of attribute instance values 1126.

The sensor instance 1116 is associated with the logging overlay instance 1118 which corresponds to a specific implementation of the logging overlay template 1112. The logging overlay template 1112 defines common structures and data for performing data logging. Data logging may be achieved in several ways and for several purposes, and therefore, is well-suited to have multiple possible implementations. The logging overlay instance 1118 is an implementation of the logging overlay template 1112 which contains processing logic operable to record logging data to a distributed ledger or blockchain. Thus, various aspects of the processing performed by the sensor instance 1116 (e.g., values set, values obtained, etc.) may be logged by associating the sensor instance 1116 with the logging overlay instance 1118.

As the key 1122 is present in the sensor template 1106, index records for the sensor instances 1114 and 1116 are created and maintained in the soil moisture sensor model 1100. Referring to FIG. 11B, an index node 1128 that is associated with the sensor template 1106 is shown. The index node 1128 is present in the soil moisture sensor model 1100. The index node 1128 includes a set of index records 1130 associated with the sensor instances 1114 and 1116. The set of index records 1130 may be a sorted table with position number 1132, index values 1134, and identifiers 1136, as columns thereof. Further, the set of index records 1130 is shown to include an index record 1130*a* associated with the sensor instance 1114 and an index record 1130*b* associated with the sensor instance 1114. The index record 1130*a* includes the GPS location 'A' 1124*a* and a unique ID 1138 of the sensor instance 1114. Similarly, the index record 1130*b* the GPS location 'B' 1124*b* and a unique ID 1140 of the sensor instance 1116.

An executable, run-time, version of the overlay structure shown in FIGS. 11A and 11B is generated during the execution of the soil moisture sensor model 1100. More particularly, the sensor template 1106 is obtained and a run-time sensor interface overlay is obtained (or generated if not already created). The run-time sensor interface overlay comprises a composition of the sensor interface template 1110 and the sensor interface instance 1108. The sensor template 1106 and the run-time sensor interface overlay correspond to an executable template. One or more data elements relating to the first soil moisture sensor are received. The one or more data elements may comprise data such as the GPS location 'A' 1124*a*, and the IP address 'A' 1124*b*, for the first soil moisture sensor. Using the sensor template 1106 as an ontology, the one or more data elements are mapped to the sensor template 1106 to generate the sensor instance 1114. As a result, the set of attribute instance values 1124 in the sensor instance 1114 contains the one or more data elements mapped to the ontology defined by the sensor template 1106. The sensor template 1106 and the sensor instance 1114 form a run-time node which is an executable run-time node.

A similar process is repeated for the sensor instance 1116 when one or more data elements associated with the second soil moisture sensor are received. This results in the generation of another executable run-time node comprising the sensor template 1106 and the sensor instance 1116. Additionally, the sensor instance 1116 is an executable node instance. The index management module 224 creates the index records 1130*a* and 1130*b* upon the generation of the sensor instance 1114 and the sensor instance 1116, respectively.

Once generated, the soil moisture sensor model 1100 may be used to read soil moisture measurements from the two sensors (either periodically or continuously). In an example, the stimuli management module 212 may receive a stimulus with the context of the stimulus indicative of the GPS location 'A' 1124*a*. The stimulus is a query that indicates querying of soil moisture measurements of a soil moisture sensor at the GPS location 'A' 1124*a*. Further, the controller module 206, in conjunction with the index management module 224, identifies that the index record 1130*a* of the index node 1128 includes the GPS location 'A' 1124*a*. Further, the controller module 206, in conjunction with the index management module 224, identifies the unique ID 1138 that is mapped to the GPS location 'A' 1124*a* in the index record 1130*a*. The controller module 206 further identifies the sensor instance 1114 in the soil moisture sensor model 1100 based on the identified unique ID 1138. Further, the controller module 206 executes an operation associated with the stimulus based on the identified sensor instance 1114 and the sensor template 1106 associated with the sensor instance 1114. The controller module 206 further generates an outcome based on the execution of the operation. In the above-described example, the outcome includes the soil moisture sensor measurements. As the index node 1128 is present in the soil moisture sensor model 1100, latency associated with identifying the sensor instance 1114 is significantly reduced.

Although it is described that the soil moisture sensor model 1100 corresponds to two soil moisture sensors, the scope of the present disclosure is not limited to it. In actual implementation in the real world, the soil moisture sensor model 1100 may include a large number of soil moisture sensors. In such an implementation, indexing of a large number of soil moisture sensors aids in retrieving soil moisture sensor measurements with reduced latency.

Figure 12A:
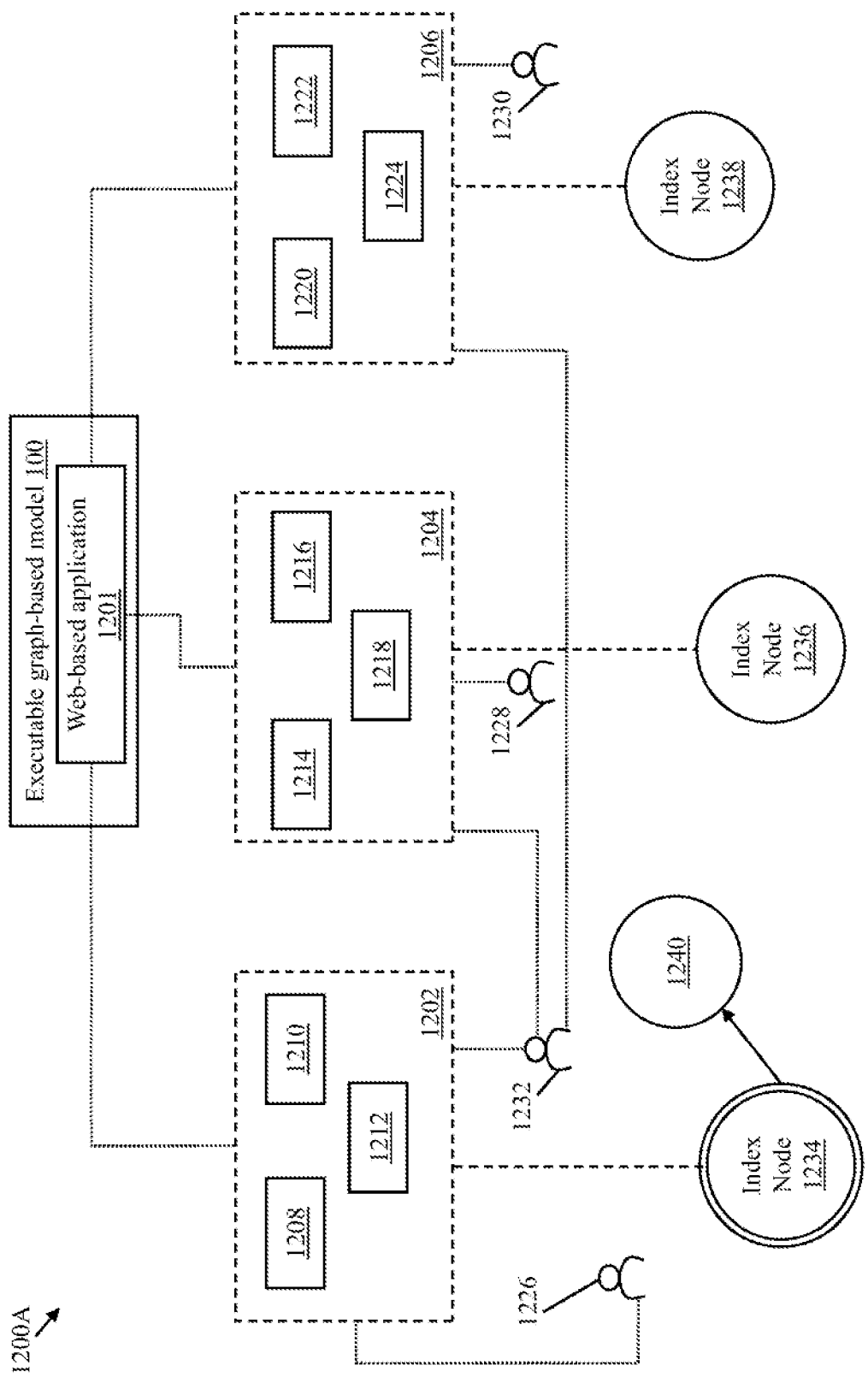
FIGS. 12A and 12B are schematic diagrams that, collectively, illustrate an example implementation of indexing in the executable graph-based model for a web-based application, in accordance with an embodiment of the present disclosure.
Figure 12B:
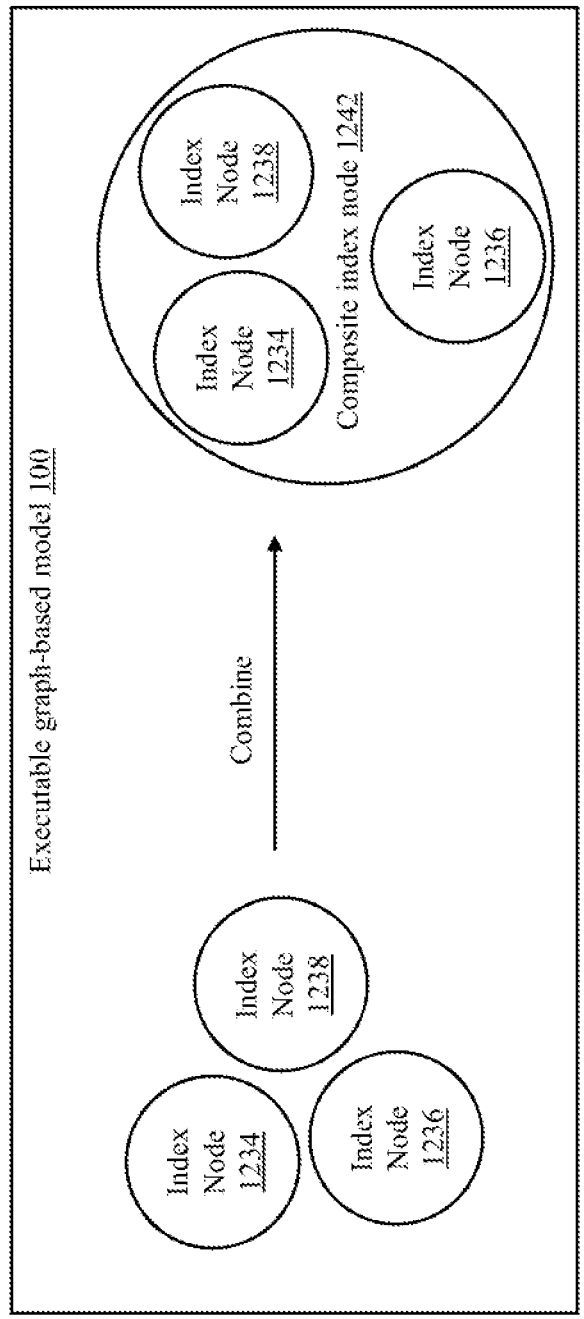

FIGS. 12A and 12B are schematic diagrams 1200A and 1200B that, collectively, illustrate an example implementation of indexing in the executable graph-based model 100 for a web-based application 1201, in accordance with an embodiment of the present disclosure. Referring to FIG. 12A, the web-based application 1201 is implemented by the executable graph-based model 100. The web-based application 1201 includes a database module 1202, a back-end module 1204, and a front-end module 1206 that are implemented by way of the executable graph-based model 100. Further, the database module 1202 includes sub-modules 1208, 1210, and 1212. Each sub-module of the sub-modules 1208, 1210, and 1212 corresponds to an implementation of a first node template (not shown). In other words, each of the sub-modules 1208, 1210, and 1212 is a node instance associated with the first node template. Similarly, the back-end module 1204 includes sub-modules 1214, 1216, and 1218 and the front-end module 1206 includes sub-modules 1220, 1222, and 1224. The sub-modules 1214, 1216, and 1218 are implementations of a second node template, whereas the sub-modules 1220, 1222, and 1224 are implementations of a third node template.

An entity 1226 (for example, a developer of the web-based application 1201) is associated with the database module 1202. Similarly, entities 1228 and 1230 are associated with the back-end module 1204 and the front-end module 1206, respectively. Further, an entity 1232 is associated with the database module 1202, the back-end module 1204, and the front-end module 1206. In an example, the entities 1226, 1228, and 1230 correspond to developers developing the corresponding modules, whereas the entity 1232 corresponds to a manager that overlooks each of the modules. The sub-modules 1208, 1210, and 1212 are indexed in the executable graph-based model 100 based on the first node template associated therewith. The executable graph-based model 100 further includes an index node 1234 that corresponds to the database module 1202, and hence, includes index records of the sub-modules 1208, 1210, and 1212. The executable graph-based model 100 further includes index nodes 1236 and 1238 that correspond to back-end and front-end modules 1204 and 1206, respectively. The index node 1236 includes index records of the sub-modules 1214, 1216, and 1218, whereas the index node 1238 includes index records of the sub-modules 1220, 1222, and 1224. Additionally, each of the index nodes 1234, 1236, and 1238 corresponds to a run-time index node. Thus, various modules of the web-based application 1201 are indexed individually, instead of indexing the web-based application 1201 in its entirety. As a result, retrieval of a unique ID of a sub-module by utilizing the index records occurs swiftly as the search space is small. The search space for the entity 1226 for querying a unique ID of one of the associated sub-modules is the index records included in the index node 1234. Similarly, the search spaces for the entities 1228 and 1230 are index records included in the index nodes 1236 and 1238, respectively.

As the database module 1202 is associated with the entity 1226, and overlooked by the entity 1232, only the entities 1226 and 1232 have access to the index node 1234 that is associated with the database module 1202. As a result, the entities 1226 and 1232 can query the index node 1234 to retrieve unique IDs of any of the sub-modules 1208, 1210, and 1212 based on index values associated therewith. Similarly, the index nodes 1236 and 1238 are accessible to the entities 1228 and 1230, respectively, along with the entity 1232. However, the index node 1234 is not accessible to the entities 1228 and 1230. Similarly, the index node 1236 is not accessible to the entities 1226 and 1230, and the index node 1238 is not accessible to the entities 1226 and 1228. Thus, the index nodes are secured as various entities have access to associated index nodes only. In an embodiment, the database module 1202 may include PII or PHI data. In such an embodiment, the index records in the index node 1234 need to be secured. Hence an overlay node 1240 (such as an encryption overlay node or obfuscation overlay node) is associated with the index node 1234.

Referring to FIG. 12B, in an embodiment of the present disclosure, the index nodes 1234, 1236, and 1238 may be dynamically combined to form a composite index node 1242. In an example, the index nodes 1234, 1236, and 1238 may be dynamically combined using one of a join operation and a merge operation. The composite index node 1242 includes the index records of the sub-modules 1208-1224. Further, only the entity 1232 has access to the composite index node 1242. The entity 1232 may query the composite index node 1242 to retrieve the unique ID of any of the sub-modules 1208-1224. The index records of the sub-modules 1208-1224 may be sorted in one of an alphabetical order, an increasing order, a decreasing order, a numerical order, and an alphanumerical order, in the composite index node 1242.

Figure 13:
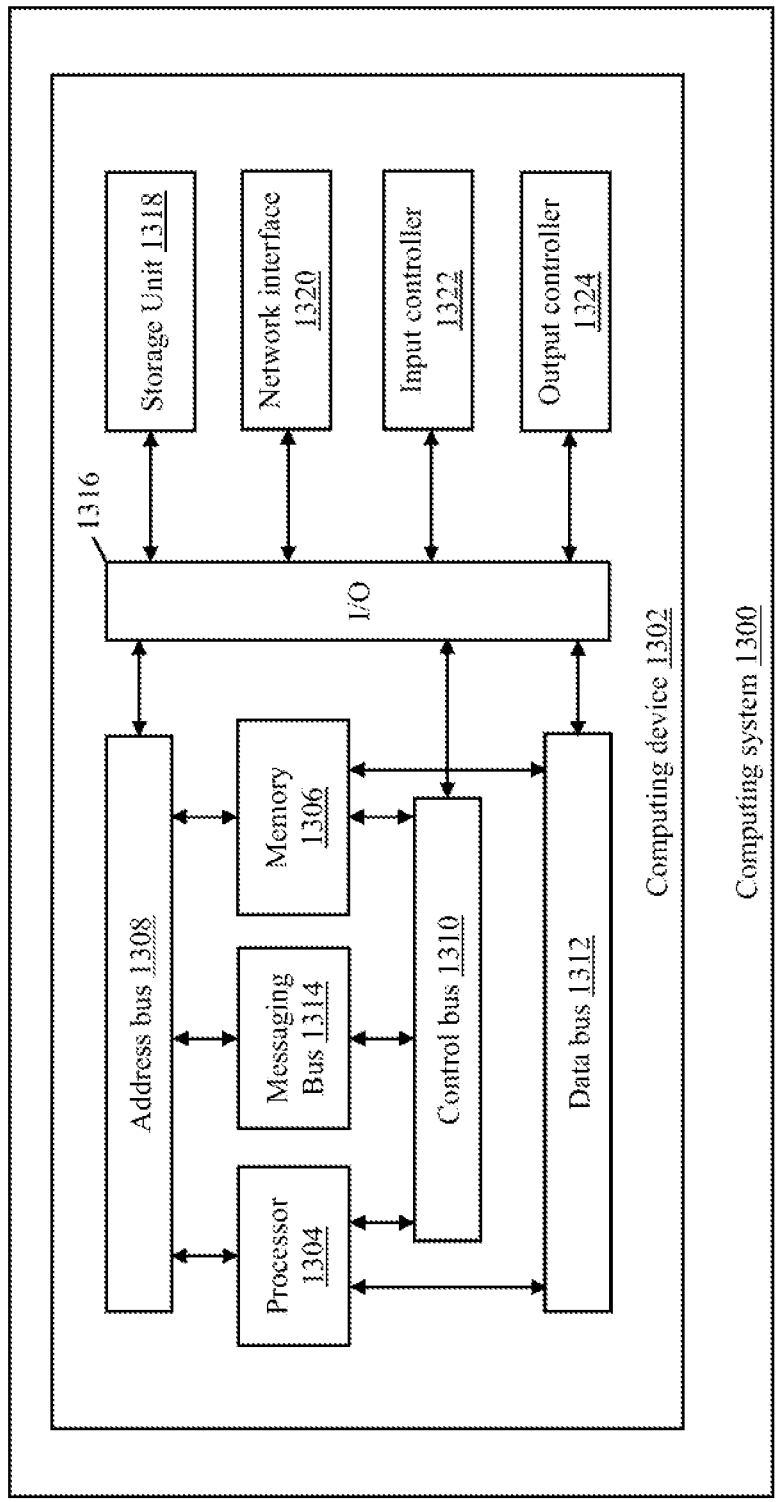
FIG. 13 shows an example computing system for carrying out methods of the present disclosure, in accordance with an embodiment of the present disclosure.

FIG. 13 shows an example computing system 1300 for carrying out the methods of the present disclosure, in accordance with an embodiment of the present disclosure. Specifically, FIG. 13 shows a block diagram of an embodiment of the computing system 1300 according to example embodiments of the present disclosure.

The computing system 1300 may be configured to perform any of the operations disclosed herein, such as, for example, any of the operations discussed with reference to the functional modules described in relation to FIG. 2. The computing system 1300 can be implemented as a conventional computer system, an embedded controller, a laptop, a server, a mobile device, a smartphone, a set-top box, a kiosk, a vehicular information system, one or more processors associated with a television, a customized machine, any other hardware platform, or any combination or multiplicity thereof. In one embodiment, the computing system 1300 is a distributed system configured to function using multiple computing machines interconnected via a data network or bus system.

The computing system 1300 includes computing devices (such as a computing device 1302). The computing device 1302 includes one or more processors (such as a processor 1304) and a memory 1306. The processor 1304 may be any general-purpose processor(s) configured to execute a set of instructions. For example, the processor 1304 may be a processor core, a multiprocessor, a reconfigurable processor, a microcontroller, a digital signal processor (DSP), an ASIC, a graphics processing unit (GPU), a neural processing unit (NPU), an accelerated processing unit (APU), a brain processing unit (BPU), a data processing unit (DPU), a holographic processing unit (HPU), an intelligent processing unit (IPU), a microprocessor/microcontroller unit (MPU/MCU), a radio processing unit (RPU), a tensor processing unit (TPU), a vector processing unit (VPU), a wearable processing unit (WPU), an FPGA, a programmable logic device (PLD), a controller, a state machine, gated logic, discrete hardware component, any other processing unit, or any combination or multiplicity thereof. In one embodiment, the processor 1304 may be multiple processing units, a single processing core, multiple processing cores, special purpose processing cores, co-processors, or any combination thereof. The processor 1304 may be communicatively coupled to the memory 1306 via an address bus 1308, a control bus 1310, a data bus 1312, and a messaging bus 1314.

The memory 1306 may include non-volatile memories such as a read-only memory (ROM), a programmable read-only memory (PROM), an erasable programmable read-only memory (EPROM), a flash memory, or any other device capable of storing program instructions or data with or without applied power. The memory 1306 may also include volatile memories, such as a random-access memory (RAM), a static random-access memory (SRAM), a dynamic random-access memory (DRAM), and a synchronous dynamic random-access memory (SDRAM). The memory 1306 may include single or multiple memory modules. While the memory 1306 is depicted as part of the computing device 1302, a person skilled in the art will recognize that the memory 1306 can be separate from the computing device 1302.

The memory 1306 may store information that can be accessed by the processor 1304. For instance, the memory 1306 (e.g., one or more non-transitory computer-readable storage mediums, memory devices) may include computer-readable instructions (not shown) that can be executed by the processor 1304. The computer-readable instructions may be software written in any suitable programming language or may be implemented in hardware. Additionally, or alternatively, the computer-readable instructions may be executed in logically and/or virtually separate threads on the processor 1304. For example, the memory 1306 may store instructions (not shown) that when executed by the processor 1304 cause the processor 1304 to perform operations such as any of the operations and functions for which the computing system 1300 is configured, as described herein. Additionally, or alternatively, the memory 1306 may store data (not shown) that can be obtained, received, accessed, written, manipulated, created, and/or stored. The data can include, for instance, the data and/or information described herein in relation to FIGS. 1-11. In some implementations, the computing device 1302 may obtain from and/or store data in one or more memory device(s) that are remote from the computing system 1300.

The computing device 1302 may further include an input/output (I/O) interface 1316 communicatively coupled to the address bus 1308, the control bus 1310, and the data bus 1312. The data bus 1312 and messaging bus 1314 may include a plurality of tunnels that may support parallel execution of messages by the overlay system 202. The I/O interface 1316 is configured to couple to one or more external devices (e.g., to receive and send data from/to one or more external devices). Such external devices, along with the various internal devices, may also be known as peripheral devices. The I/O interface 1316 may include both electrical and physical connections for operably coupling the various peripheral devices to the computing device 1302. The I/O interface 1316 may be configured to communicate data, addresses, and control signals between the peripheral devices and the computing device 1302. The I/O interface 1316 may be configured to implement any standard interface, such as a small computer system interface (SCSI), a serial-attached SCSI (SAS), a fiber channel, a peripheral component interconnect (PCI), a PCI express (PCIe), a serial bus, a parallel bus, an advanced technology attachment (ATA), a serial ATA (SATA), a universal serial bus (USB), Thunderbolt, FireWire, various video buses, or the like. The I/O interface 1316 is configured to implement only one interface or bus technology. Alternatively, the I/O interface 1316 is configured to implement multiple interfaces or bus technologies. The I/O interface 1316 may include one or more buffers for buffering transmissions between one or more external devices, internal devices, the computing device 1302, or the processor 1304. The I/O interface 1316 may couple the computing device 1302 to various input devices, including mice, touch screens, scanners, biometric readers, electronic digitizers, sensors, receivers, touchpads, trackballs, cameras, microphones, keyboards, any other pointing devices, or any combinations thereof. The I/O interface 1316 may couple the computing device 1302 to various output devices, including video displays, speakers, printers, projectors, tactile feedback devices, automation control, robotic components, actuators, motors, fans, solenoids, valves, pumps, transmitters, signal emitters, lights, and so forth.

The computing system 1300 may further include a storage unit 1318, a network interface 1320, an input controller 1322, and an output controller 1324. The storage unit 1318, the network interface 1320, the input controller 1322, and the output controller 1324 are communicatively coupled to the central control unit (e.g., the memory 1306, the address bus 1308, the control bus 1310, and the data bus 1312) via the I/O interface 1316. The network interface 1320 communicatively couples the computing system 1300 to one or more networks such as wide area networks (WAN), local area networks (LAN), intranets, the Internet, wireless access networks, wired networks, mobile networks, telephone networks, optical networks, or combinations thereof. The network interface 1320 may facilitate communication with packet-switched networks or circuit-switched networks which use any topology and may use any communication protocol. Communication links within the network may involve various digital or analog communication media such as fiber optic cables, free-space optics, waveguides, electrical conductors, wireless links, antennas, radio-frequency communications, and so forth.

The storage unit 1318 is a computer-readable medium, preferably a non-transitory computer-readable medium, comprising one or more programs, the one or more programs comprising instructions which when executed by the processor 1304 cause the computing system 1300 to perform the method steps of the present disclosure. Alternatively, the storage unit 1318 is a transitory computer-readable medium. The storage unit 1318 can include a hard disk, a floppy disk, a compact disc read-only memory (CD-ROM), a digital versatile disc (DVD), a Blu-ray disc, a magnetic tape, a flash memory, another non-volatile memory device, a solid-state drive (SSD), any magnetic storage device, any optical storage device, any electrical storage device, any semiconductor storage device, any physical-based storage device, any other data storage device, or any combination or multiplicity thereof. In one embodiment, the storage unit 1318 stores one or more operating systems, application programs, program modules, data, or any other information. The storage unit 1318 is part of the computing device 1302. Alternatively, the storage unit 1318 is part of one or more other computing machines that are in communication with the computing device 1302, such as servers, database servers, cloud storage, network attached storage, and so forth.

The input controller 1322 may include suitable logic, circuitry, interfaces, and/or code, executable by the circuitry, that may be configured to control one or more input devices that may be configured to receive an input (the stimulus 232) for the overlay system 202. The output controller 1324 may include suitable logic, circuitry, interfaces, and/or code, executable by the circuitry, that may be configured to control one or more output devices that may be configured to render/output the outcome of the operation executed to process the received input (the stimulus 232).

Figure 14:
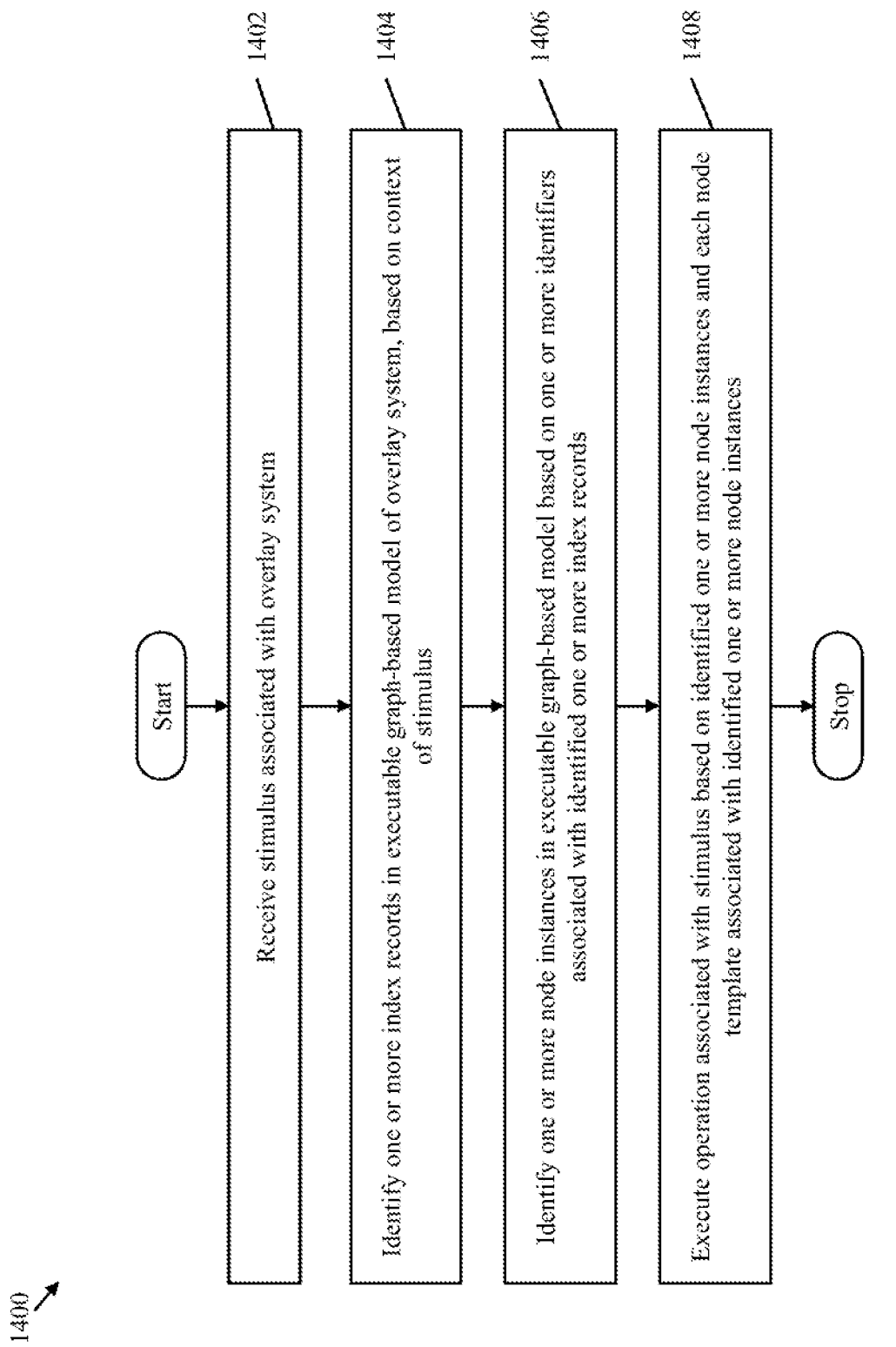
FIG. 14 is a flowchart that illustrates a method for facilitating indexing in the executable graph-based model, in accordance with an embodiment of the present disclosure.

FIG. 14 is a flowchart 1400 that illustrates a method for facilitating indexing in the executable graph-based model 100, in accordance with an embodiment of the present disclosure. Referring to FIG. 14, at 1402, the processing circuitry of the overlay system 202 (e.g., the stimuli management module 212) receives a stimulus (e.g., the stimulus 232) associated with the overlay system 202. The context of the stimulus is indicative of at least a reference index value (such as the index value 708). At 1404, the processing circuitry (e.g., the stimuli management module 212 in conjunction with the controller module 206 and the index management module 224) identifies, one or more index records (such as the index record 932) in the executable graph-based model 100, based on the context of the stimulus 232. At 1406, the processing circuitry (e.g., the controller module 206) identifies one or more node instances (such as the vertex node instance 306) in the executable graph-based model 100 based on the one or more identifiers (such as the unique ID 340). At step 1408, the processing circuitry (e.g., controller module 206) executes the operation associated with stimulus 232 based on the identified one or more node instances and each node template (such as the vertex node template 304) associated with the identified one or more node instances.

The disclosed embodiments encompass numerous advantages including an efficient and seamless approach for facilitation of indexing in executable graph-based models. A concept of indexing disclosed herein allows for efficient identification of required data in the overlay system 202. Hence, while looking for node instances with a specific attribute value, associated node instances are identified by using in-situ index nodes. Therefore, performing a search for node instances requires significantly less time. Additionally, the disclosed embodiments provide secured indexing as only the entities (such as the entities 1226 and 1232) associated with an operational facet (such as the module 1202 of the web-based application 1201) of the executable graph-based model 100 have access to the index nodes (such as the index node 1234) associated with the operational facet. Thus, confidential data present in the executable graph-based model 100 is uncompromised. Further, the systems and methods disclosed herein allow for dynamic scale-up and scale-down of index records without having to make any significant change. Also, the node instances, node templates, and index nodes in the executable graph-based model 100 are loaded as and when they are required. The systems and methods disclosed herein allow for the segregation of data and processing logic, and hence, ensure mutual independence thereof. Application areas of the systems and methods disclosed herein may include, but are not limited to, industrial processes, robotics, home security, and automation industry that require storing large datasets and retrieval of data with high security and reduced latency.

Certain embodiments of the disclosure may be found in the disclosed systems, methods, and non-transitory computer-readable medium, for facilitating indexing in executable graph-based models. The methods and systems disclosed herein include various operations performed by the processing circuitry (e.g., the controller module 206, the transaction module 208, the stimuli management module 212, the index management module 224, any other element of the overlay system 202, or a combination of two or more elements of the overlay system 202). The overlay system disclosed herein includes the storage element configured to store the executable graph-based model that includes a plurality of index nodes, a plurality of node templates, and a plurality of node instances. Each node template is associated with a set of node instances of the plurality of node instances and a set of index nodes of the plurality of index nodes, such that each index node, of the set of index nodes, is associated with the set of node instances. Further, each node template corresponds to a predefined node structure, whereas the associated set of node instances corresponds to a set of implementations of the corresponding node template. Additionally, each index node, of the set of index nodes, includes a set of index records associated with the set of node instances, with each index record comprising an identifier of the corresponding node instance and an index value derived from one or more node instance values of the corresponding node instance. The overlay system further includes the processing circuitry that is coupled to the storage element. The processing circuitry is configured to receive a first stimulus associated with the overlay system, where a first context of the first stimulus is indicative of at least a reference index value. The processing circuitry is further configured to identify, in the executable graph-based model, based on the first context of the first stimulus, one or more index records that include the reference index value. Further, the processing circuitry identifies, from the plurality of node instances, one or more node instances having one or more identifiers associated with the identified one or more index records, respectively. Additionally, the processing circuitry executes an operation associated with the first stimulus based on the identified one or more node instances and each node template associated with the identified one or more node instances.

In some embodiments, the identified one or more index records are associated with one or more index nodes, of the plurality of index nodes, such that each index node, of the one or more index nodes, includes at least one index record of the identified one or more index records.

In some embodiments, prior to the execution of the operation associated with the first stimulus, the processing circuitry is further configured to load, in the executable graph-based model, at least one of a group consisting of the identified one or more node instances, each node template associated with the identified one or more node instances, and the one or more index nodes, with corresponding data and processing logic.

In some embodiments, each node template, of the plurality of node templates, includes a set of value templates. For each node template of the plurality of node templates, each node instance of the associated set of node instances includes a set of node instance values that is associated with the set of value templates.

In some embodiments, each node template, of the plurality of node templates, further includes a set of keys, with each key defined based on one or more value templates of the set of value templates. Further, for each node template of the plurality of node templates, each index node of the associated set of index nodes is linked with a key of the set of keys. Additionally, for each index record of each index node, the one or more node instance values, from which the associated index value is derived, are identified from the set of node instance values of the corresponding node instance based on the one or more value templates that define the key associated with the corresponding index node, respectively.

In some embodiments, for each node template of the plurality of node templates, the set of index records of each index node of the associated set of index nodes is mutated based on a first set of stimuli. The mutation of the set of index records corresponds to at least one of a group consisting of creation of at least one index record of the set of index records, modification of at least one index record of the set of index records, and deletion of at least one index record of the set of index records.

In some embodiments, the first set of stimuli precedes the first stimulus for at least one of a group consisting of the creation and the modification of at least one index record of the set of index records. Additionally, the first set of stimuli follows the first stimulus for at least one of a group consisting of the modification and the deletion of at least one index record of the set of index records.

In some embodiments, a first node template, of the plurality of node templates, is associated with (i) a first set of node instances of the plurality of node instances and (ii) a first set of index nodes of the plurality of index nodes. Further, the set of index records, of each index node of the first set of index nodes, is mutated based on a first set of stimuli. The mutation of the set of index records corresponds to at least one of a group consisting of creation of at least one index of the set of index records, modification of at least one index record of the set of index records, and deletion of at least one index record of the set of index records.

In some embodiments, the executable graph-based model further includes a plurality of publisher overlay nodes and a plurality of handler overlay nodes. A first set of publisher overlay nodes, of the plurality of publisher overlay nodes, is associated with the first set of node instances such that a first publisher overlay node is an overlay of a first node instance of the first set of node instances. Further, a first set of handler overlay nodes, of the plurality of handler overlay nodes, is associated with the first set of index nodes such that a first handler overlay node and a second handler overlay node are overlays of a first index node and a second index node, of the first set of index nodes, respectively. Additionally, the first publisher overlay node is configured to generate and publish a first set of messages to be communicated by the first node instance upon the mutation thereof. Further, the first handler overlay node is configured to subscribe to the first set of messages, process the first set of messages, and mutate a first set of index records, of the first index node, based on the processing of the first set of messages. Similarly, the second handler overlay node is configured to subscribe to the first set of messages, process the first set of messages, and mutate a second set of index records, of the second index node, based on the processing of the first set of messages.

In some embodiments, when the first node instance is created, the first set of messages is indicative of the creation of the first node instance. Further, the first handler overlay node and the second handler overlay node create a first index record and a second index record, of the first set of index records and the second set of index records, associated with the first node instance, respectively. The first index record includes an identifier of the first node instance and a first index value that is derived from at least one node instance value, of the first node instance, included in a first message of the first set of messages. Similarly, the second index record includes the identifier of the first node instance and a second index value that is derived from at least one node instance value, of the first node instance, included in a second message of the first set of messages. When the first node instance is modified, the first set of messages is indicative of the modification of the first node instance. Further, the first handler overlay node and the second handler overlay node modify the first index value and the second index value with at least one modified instance value, of the first node instance, included in the first message and the second message, respectively. When the first node instance is deleted, the first set of messages is indicative of the deletion of the first node instance, and the first handler overlay node and the second handler overlay node delete the first index record and the second index record, respectively.

In some embodiments, the first node template includes a first value template, a second value template, a third value template, a first key, and a second key, such that the first key is defined based on the first value template, and the second key is defined based on the second value template and the third value template. Further, the first node instance includes a first node instance value, a second node instance value, and a third node instance value that are associated with the first value template, the second value template, and the third value template, respectively. Further, the first set of index nodes includes the first index node linked with the first key, and the second index node linked with the second key. The first set of messages includes a first message for the first key and a second message for the second key. Further, the first message includes an identifier of the first node template, an indication that the first node instance is mutated, an identifier of the first node instance, the first value template, and the first node instance value. Similarly, the second message includes the identifier of the first node template, the indication that the first node instance is mutated, the identifier of the first node instance, the second value template, the third value template, the second node instance value, and the third node instance value. Additionally, a first index record, of the first index node, associated with the first node instance is mutated based on the first message, and a second index record, of the second index node, associated with the first node instance is mutated based on the second message.

In some embodiments, the first index record includes the identifier of the first node instance and a first index value that corresponds to the first node instance value. Similarly, the second index record includes the identifier of the first node instance and a second index value that corresponds to a combination of the second node instance value and the third node instance value.

In some embodiments, the first handler overlay node is further configured to identify, from the first set of messages, the first message that is associated with the first index node based on the identifier of the first node template and the first value template included in the first message, and mutate the first index record, of the first index node, based on the first message. Similarly, the second handler overlay node is further configured to identify, from the first set of messages, the second message that is associated with the second index node based on the identifier of the first node template, the second value template, and the third value template included in the second message, and mutate the second index, of the second index node, based on the second message.

In some embodiments, each node template of the plurality of node templates corresponds to one of a group consisting of a hyper-edge node template, a vertex node template, and an overlay node template. Similarly, each node instance of the plurality of node instances corresponds to one of a group consisting of a hyper-edge node instance, a vertex node instance, and an overlay node instance.

In some embodiments, each index node of the plurality of index nodes includes an index template that corresponds to a predefined node structure and an index instance that corresponds to an implementation of a corresponding index template.

In some embodiments, at least one index node of the plurality of index nodes is a composite index node that corresponds to a combination of two or more index nodes of the plurality of index nodes based on associated two or more node templates being coupled to each other.

In some embodiments, the plurality of node templates includes a first node template, a second node template, and a third node template, with each of the first node template and the second node template corresponding to a vertex node template, and the third node template corresponding to a hyper-edge node template. The third node template couples the first node template to the second node template. Further, the first node template, the second node template, and the third node template are associated with a composite set of index nodes of the plurality of index nodes.

In some embodiments, a node instance value of each node instance, of the plurality of node instances, corresponds to one of a group consisting of an attribute value, a label, and metadata.

In some embodiments, the executable graph-based model includes a first plane and a second plane such that the first plane includes the plurality of index nodes and the second plane includes the plurality of node templates and the plurality of node instances.

In some embodiments, the first stimulus corresponds to one of a group consisting of a query and a command.

In some embodiments, when the first stimulus corresponds to the query, the execution of the operation associated with the first stimulus corresponds to retrieval of data from each of the one or more node instances. When the first stimulus corresponds to the command, the execution of the operation associated with the first stimulus corresponds to mutation of each of the one or more node instances.

A person of ordinary skill in the art will appreciate that embodiments and exemplary scenarios of the disclosed subject matter may be practiced with various computer system configurations, including multi-core multiprocessor systems, minicomputers, mainframe computers, computers linked or clustered with distributed functions, as well as pervasive or miniature computers that may be embedded into virtually any device. Further, the operations may be described as a sequential process, however, some of the operations may be performed in parallel, concurrently, and/or in a distributed environment, and with program code stored locally or remotely for access by single or multiprocessor machines. In addition, in some embodiments, the order of operations may be rearranged without departing from the spirit of the disclosed subject matter.

Techniques consistent with the present disclosure provide, among other features, systems and methods for facilitating indexing in executable graph-based models. While various embodiments of the disclosed systems and methods have been described above, it should be understood that they have been presented for purposes of example only, and not limitations. It is not exhaustive and does not limit the present disclosure to the precise form disclosed. Modifications and variations are possible in light of the above teachings or may be acquired from practicing the present disclosure, without departing from the breadth or scope.

Moreover, for example, the present technology/system may achieve the following configurations:

1. An overlay system, comprising:
    a storage element configured to store an executable graph-based model that comprises a plurality of index nodes, a plurality of node templates, and a plurality of node instances,
        wherein each node template is associated with (i) a set of node instances of the plurality of node instances and (ii) a set of index nodes of the plurality of index nodes, such that each index node, of the set of index nodes, is associated with the set of node instances,
        wherein each node template corresponds to a predefined node structure, whereas the associated set of node instances corresponds to a set of implementations of the corresponding node template, and
        wherein each index node, of the set of index nodes, comprises a set of index records associated with the set of node instances, with each index record comprising an identifier of the corresponding node instance and an index value derived from one or more node instance values of the corresponding node instance; and
    processing circuitry that is coupled to the storage element, and configured to:
        receive a first stimulus associated with the overlay system, wherein a first context of the first stimulus is indicative of at least a reference index value;
        identify, in the executable graph-based model, based on the first context of the first stimulus, one or more index records that include the reference index value;
        identify, from the plurality of node instances, one or more node instances having one or more identifiers associated with the identified one or more index records, respectively; and
        execute an operation associated with the first stimulus based on the identified one or more node instances and each node template associated with the identified one or more node instances.

2. The overlay system of 1, wherein the identified one or more index records are associated with one or more index nodes, of the plurality of index nodes, such that each index node, of the one or more index nodes, includes at least one index record of the identified one or more index records.

3. The overlay system of 2, wherein prior to the execution of the operation associated with the first stimulus, the processing circuitry is further configured to load, in the executable graph-based model, at least one of a group consisting of the identified one or more node instances, each node template associated with the identified one or more node instances, and the one or more index nodes, with corresponding data and processing logic.

4. The overlay system of 1, wherein each node template, of the plurality of node templates, comprises a set of value templates, and wherein for each node template of the plurality of node templates, each node instance of the associated set of node instances comprises a set of node instance values that is associated with the set of value templates.

5. The overlay system of 4,
    wherein each node template, of the plurality of node templates, further comprises a set of keys, with each key defined based on one or more value templates of the set of value templates,
    wherein for each node template of the plurality of node templates, each index node of the associated set of index nodes is linked with a key of the set of keys, and
    wherein for each index record of each index node, the one or more node instance values, from which the associated index value is derived, are identified from the set of node instance values of the corresponding node instance based on the one or more value templates that define the key associated with the corresponding index node, respectively.

6. The overlay system of 1, wherein for each node template of the plurality of node templates, the set of index records of each index node of the associated set of index nodes is mutated based on a first set of stimuli, and wherein the mutation of the set of index records corresponds to at least one of a group consisting of (i) creation of at least one index record of the set of index records, (ii) modification of at least one index record of the set of index records, and (iii) deletion of at least one index record of the set of index records.

7. The overlay system of 6, wherein the first set of stimuli precedes the first stimulus for at least one of a group consisting of the creation and the modification of at least one index record of the set of index records, and wherein the first set of stimuli follows the first stimulus for at least one of a group consisting of the modification and the deletion of at least one index record of the set of index records.

8. The overlay system of 1, wherein a first node template, of the plurality of node templates, is associated with (i) a first set of node instances of the plurality of node instances and (ii) a first set of index nodes of the plurality of index nodes, wherein the set of index records, of each index node of the first set of index nodes, is mutated based on a first set of stimuli, and wherein the mutation of the set of index records corresponds to at least one of a group consisting of (i) creation of at least one index of the set of index records, (ii) modification of at least one index record of the set of index records, and (iii) deletion of at least one index record of the set of index records.

9. The overlay system of 8,
    wherein the executable graph-based model further comprises a plurality of publisher overlay nodes and a plurality of handler overlay nodes,
    wherein a first set of publisher overlay nodes, of the plurality of publisher overlay nodes, is associated with the first set of node instances such that a first publisher overlay node is an overlay of a first node instance of the first set of node instances, wherein a first set of handler overlay nodes, of the plurality of handler overlay nodes, is associated with the first set of index nodes such that a first handler overlay node and a second handler overlay node are overlays of a first index node and a second index node, of the first set of index nodes, respectively, wherein the first publisher overlay node is configured to generate and publish a first set of messages to be communicated by the first node instance upon the mutation thereof, and wherein (i) the first handler overlay node is configured to subscribe to the first set of messages, process the first set of messages, and mutate a first set of index records, of the first index node, based on the processing of the first set of messages, and (ii) the second handler overlay node is configured to subscribe to the first set of messages, process the first set of messages, and mutate a second set of index records, of the second index node, based on the processing of the first set of messages.

10. The overlay system of 9, wherein when the first node instance is created, the first set of messages is indicative of the creation of the first node instance, and the first handler overlay node and the second handler overlay node create a first index record and a second index record, of the first set of index records and the second set of index records, associated with the first node instance, respectively, with the first index record comprising an identifier of the first node instance and a first index value that is derived from at least one node instance value, of the first node instance, included in a first message of the first set of messages, and the second index record comprising the identifier of the first node instance and a second index value that is derived from at least one node instance value, of the first node instance, included in a second message of the first set of messages, wherein when the first node instance is modified, the first set of messages is indicative of the modification of the first node instance, and the first handler overlay node and the second handler overlay node modify the first index value and the second index value with at least one modified instance value, of the first node instance, included in the first message and the second message, respectively, and wherein when the first node instance is deleted, the first set of messages is indicative of the deletion of the first node instance, and the first handler overlay node and the second handler overlay node delete the first index record and the second index record, respectively.

11. The overlay system of 9, wherein the first node template comprises a first value template, a second value template, a third value template, a first key, and a second key, such that the first key is defined based on the first value template, and the second key is defined based on the second value template and the third value template, wherein the first node instance comprises a first node instance value, a second node instance value, and a third node instance value that are associated with the first value template, the second value template, and the third value template, respectively, and the first set of index nodes comprises the first index node linked with the first key, and the second index node linked with the second key, wherein the first set of messages comprises a first message for the first key and a second message for the second key, wherein (i) the first message comprises an identifier of the first node template, an indication that the first node instance is mutated, an identifier of the first node instance, the first value template, and the first node instance value, and (ii) the second message comprises the identifier of the first node template, the indication that the first node instance is mutated, the identifier of the first node instance, the second value template, the third value template, the second node instance value, and the third node instance value, and wherein a first index record, of the first index node, associated with the first node instance is mutated based on the first message, and a second index record, of the second index node, associated with the first node instance is mutated based on the second message.

12. The overlay system of 11, wherein the first index record comprises the identifier of the first node instance and a first index value that corresponds to the first node instance value, and wherein the second index record comprises the identifier of the first node instance and a second index value that corresponds to a combination of the second node instance value and the third node instance value.

13. The overlay system of 11, wherein the first handler overlay node is further configured to (i) identify, from the first set of messages, the first message that is associated with the first index node based on the identifier of the first node template and the first value template included in the first message, and (ii) mutate the first index record, of the first index node, based on the first message, and wherein the second handler overlay node is further configured to (i) identify, from the first set of messages, the second message that is associated with the second index node based on the identifier of the first node template, the second value template, and the third value template included in the second message, and (ii) mutate the second index, of the second index node, based on the second message.

14. The overlay system of 1, wherein each node template of the plurality of node templates corresponds to one of a group consisting of a hyper-edge node template, a vertex node template, and an overlay node template, and wherein each node instance of the plurality of node instances corresponds to one of a group consisting of a hyper-edge node instance, a vertex node instance, and an overlay node instance.

15. The overlay system of 1, wherein each index node, of the plurality of index nodes, comprises (i) an index template that corresponds to a predefined node structure and (ii) an index instance that corresponds to an implementation of a corresponding index template.

16. The overlay system of 1, wherein at least one index node of the plurality of index nodes is a composite index node that corresponds to a combination of two or more index nodes, of the plurality of index nodes, based on associated two or more node templates being coupled to each other.

17. The overlay system of 1, wherein the plurality of node templates comprises a first node template, a second node template, and a third node template, with each of the first node template and the second node template corresponding to a vertex node template, and the third node template corresponding to a hyper-edge node template, wherein the third node template couples the first node template to the second node template, and wherein the first node template, the second node template, and the third node template are associated with a composite set of index nodes of the plurality of index nodes.

18. The overlay system of 1, wherein a node instance value of each node instance, of the plurality of node instances, corresponds to one of a group consisting of an attribute value, a label, and metadata.

19. The overlay system of 1, wherein the executable graph-based model comprises a first plane and a second plane such that the first plane comprises the plurality of index nodes and the second plane comprises the plurality of node templates and the plurality of node instances.

20. The overlay system of 1, wherein the first stimulus corresponds to one of a group consisting of a query and a command.

21. The overlay system of 20, wherein when the first stimulus corresponds to the query, the execution of the operation associated with the first stimulus corresponds to retrieval of data from each of the one or more node instances, and wherein when the first stimulus corresponds to the command, the execution of the operation associated with the first stimulus corresponds to mutation of each of the one or more node instances.

22. A method, comprising:
receiving, by processing circuitry of an overlay system, a first stimulus associated with the overlay system,
wherein an executable graph-based model, that comprises a plurality of index nodes, a plurality of node templates, and a plurality of node instances, is stored in a storage element of the overlay system
wherein each node template is associated with (i) a set of node instances of the plurality of node instances and (ii) a set of index nodes of the plurality of index nodes, such that each index node, of the set of index nodes, is associated with the set of node instances,
wherein each node template corresponds to a predefined node structure, whereas the associated set of node instances corresponds to a set of implementations of the corresponding node template,
wherein each index node of the set of index nodes comprises a set of index records associated with the set of node instances, with each index comprising an identifier of the corresponding node instance and an index value derived from one or more node instance values of the corresponding node instance, and
wherein a first context of the first stimulus is indicative of at least a reference index value;
identifying, by the processing circuitry, in the executable graph-based model, based on the first context of the first stimulus, one or more index records that include the reference index value;
identifying, by the processing circuitry, from the plurality of node instances, one or more node instances having one or more identifiers associated with the identified one or more index records, respectively; and
executing, by the processing circuitry, an operation associated with the first stimulus based on the one or more node instances and each node template associated with the one or more node instances.

What is claimed is:
1. An overlay system, comprising:
a storage element configured to store an executable graph-based model that comprises a plurality of index nodes, a plurality of node templates, and a plurality of node instances,
wherein each index node, each node template, and each node instance corresponds to a node in the executable graph-based model,
wherein each node template, of the plurality of node templates, is associated with (i) a set of node instances of the plurality of node instances and (ii) a set of index nodes of the plurality of index nodes, such that each index node, of the set of index nodes, is associated with the set of node instances,
wherein the executable graph-based model is indicative of the association between each node template and a corresponding set of node instances and a corresponding set of index nodes,
wherein each node template corresponds to a predefined node structure, whereas the associated set of node instances corresponds to a set of implementations of the corresponding node template, and
wherein each index node, of the set of index nodes, comprises a set of index records associated with the set of node instances, with each index record comprising an identifier of the corresponding node instance and an index value derived from one or more node instance values of the corresponding node instance; and
processing circuitry that is coupled to the storage element, and configured to:
receive a first stimulus associated with the overlay system, wherein a first context of the first stimulus is indicative of at least a reference index value;
identify, in the executable graph-based model, based on the first context of the first stimulus, one or more index records that include the reference index value;
identify, from the plurality of node instances, one or more node instances having one or more identifiers associated with the identified one or more index records, respectively; and
execute an operation associated with the first stimulus based on the identified one or more node instances and each node template associated with the identified one or more node instances.

2. The overlay system of claim 1, wherein the identified one or more index records are associated with one or more index nodes, of the plurality of index nodes, such that each index node, of the one or more index nodes, includes at least one index record of the identified one or more index records.

3. The overlay system of claim 2, wherein prior to the execution of the operation associated with the first stimulus, the processing circuitry is further configured to load, in the executable graph-based model, at least one of a group consisting of the identified one or more node instances, each node template associated with the identified one or more node instances, and the one or more index nodes, with corresponding data and processing logic.

4. The overlay system of claim 1, wherein each node template, of the plurality of node templates, comprises a set of value templates, and wherein for each node template of the plurality of node templates, each node instance of the associated set of node instances comprises a set of node instance values that is associated with the set of value templates.

5. The overlay system of claim 4,
wherein each node template, of the plurality of node templates, further comprises a set of keys, with each key defined based on one or more value templates of the set of value templates, wherein for each node template of the plurality of node templates, each index node of the associated set of index nodes is linked with a key of the set of keys, and
wherein for each index record of each index node, the one or more node instance values, from which the associated index value is derived, are identified from the set of node instance values of the corresponding node instance based on the one or more value templates that define the key associated with the corresponding index node, respectively.

6. The overlay system of claim 1, wherein for each node template of the plurality of node templates, the set of index records of each index node of the associated set of index nodes is mutated based on a first set of stimuli, and wherein the mutation of the set of index records corresponds to at least one of a group consisting of (if) creation of at least one index record of the set of index records, (ii) modification of at least one index record of the set of index records, and (iii) deletion of at least one index record of the set of index records.

7. The overlay system of claim 6, wherein the first set of stimuli precedes the first stimulus for at least one of a group consisting of the creation and the modification of at least one index record of the set of index records, and wherein the first set of stimuli follows the first stimulus for at least one of a group consisting of the modification and the deletion of at least one index record of the set of index records.

8. The overlay system of claim 1, wherein a first node template, of the plurality of node templates, is associated with (i) a first set of node instances of the plurality of node instances and (ii) a first set of index nodes of the plurality of index nodes, wherein the set of index records, of each index node of the first set of index nodes, is mutated based on a first set of stimuli, and wherein the mutation of the set of index records corresponds to at least one of a group consisting of (i) creation of at least one index of the set of index records, (ii) modification of at least one index record of the set of index records, and (iii) deletion of at least one index record of the set of index records.

9. The overlay system of claim 8,
wherein the executable graph-based model further comprises a plurality of publisher overlay nodes and a plurality of handler overlay nodes,
wherein a first set of publisher overlay nodes, of the plurality of publisher overlay nodes, is associated with the first set of node instances such that a first publisher overlay node is an overlay of a first node instance of the first set of node instances,
wherein a first set of handler overlay nodes, of the plurality of handler overlay nodes, is associated with the first set of index nodes such that a first handler overlay node and a second handler overlay node are overlays of a first index node and a second index node, of the first set of index nodes, respectively,
wherein the first publisher overlay node is configured to generate and publish a first set of messages to be communicated by the first node instance upon the mutation thereof, and
wherein (i) the first handler overlay node is configured to subscribe to the first set of messages, process the first set of messages, and mutate a first set of index records, of the first index node, based on the processing of the first set of messages, and (ii) the second handler overlay node is configured to subscribe to the first set of messages, process the first set of messages, and mutate a second set of index records, of the second index node, based on the processing of the first set of messages.

10. The overlay system of claim 9,
wherein when the first node instance is created, the first set of messages is indicative of the creation of the first node instance, and the first handler overlay node and the second handler overlay node create a first index record and a second index record, of the first set of index records and the second set of index records, associated with the first node instance, respectively, with the first index record comprising an identifier of the first node instance and a first index value that is derived from at least one node instance value, of the first node instance, included in a first message of the first set of messages, and the second index record comprising the identifier of the first node instance and a second index value that is derived from at least one node instance value, of the first node instance, included in a second message of the first set of messages,
wherein when the first node instance is modified, the first set of messages is indicative of the modification of the first node instance, and the first handler overlay node and the second handler overlay node modify the first index value and the second index value with at least one modified instance value, of the first node instance, included in the first message and the second message, respectively, and
wherein when the first node instance is deleted, the first set of messages is indicative of the deletion of the first node instance, and the first handler overlay node and the second handler overlay node delete the first index record and the second index record, respectively.

11. The overlay system of claim 9,
wherein the first node template comprises a first value template, a second value template, a third value template, a first key, and a second key, such that the first key is defined based on the first value template, and the second key is defined based on the second value template and the third value template,
wherein the first node instance comprises a first node instance value, a second node instance value, and a third node instance value that are associated with the first value template, the second value template, and the third value template, respectively, and the first set of index nodes comprises the first index node linked with the first key, and the second index node linked with the second key,
wherein the first set of messages comprises a first message for the first key and a second message for the second key,
wherein (i) the first message comprises an identifier of the first node template, an indication that the first node instance is mutated, an identifier of the first node instance, the first value template, and the first node instance value, and (ii) the second message comprises the identifier of the first node template, the indication that the first node instance is mutated, the identifier of the first node instance, the second value template, the third value template, the second node instance value, and the third node instance value, and wherein a first index record, of the first index node, associated with the first node instance is mutated based on the first message, and a second index record, of the second index node, associated with the first node instance is mutated based on the second message.

12. The overlay system of claim 11, wherein the first index record comprises the identifier of the first node instance and a first index value that corresponds to the first node instance value, and wherein the second index record comprises the identifier of the first node instance and a second index value that corresponds to a combination of the second node instance value and the third node instance value.

13. The overlay system of claim 11,
wherein the first handler overlay node is further configured to (i) identify, from the first set of messages, the first message that is associated with the first index node based on the identifier of the first node template and the first value template included in the first message, and (ii) mutate the first index record, of the first index node, based on the first message, and wherein the second handler overlay node is further configured to (i) identify, from the first set of messages, the second message that is associated with the second index node based on the identifier of the first node template, the second value template, and the third value template included in the second message, and (ii) mutate the second index, of the second index node, based on the second message.

14. The overlay system of claim 1, wherein each node template of the plurality of node templates corresponds to one of a group consisting of a hyper-edge node template, a vertex node template, and an overlay node template, and wherein each node instance of the plurality of node instances corresponds to one of a group consisting of a hyper-edge node instance, a vertex node instance, and an overlay node instance.

15. The overlay system of claim 1, wherein each index node, of the plurality of index nodes, comprises (i) an index template that corresponds to a predefined node structure and (ii) an index instance that corresponds to an implementation of a corresponding index template.

16. The overlay system of claim 1, wherein at least one index node of the plurality of index nodes is a composite index node that corresponds to a combination of two or more index nodes, of the plurality of index nodes, based on associated two or more node templates being coupled to each other.

17. The overlay system of claim 1, wherein the plurality of node templates comprises a first node template, a second node template, and a third node template, with each of the first node template and the second node template corresponding to a vertex node template, and the third node template corresponding to a hyper-edge node template, wherein the third node template couples the first node template to the second node template, and wherein the first node template, the second node template, and the third node template are associated with a composite set of index nodes of the plurality of index nodes.

18. The overlay system of claim 1, wherein a node instance value of each node instance, of the plurality of node instances, corresponds to one of a group consisting of an attribute value, a label, and metadata.

19. The overlay system of claim 1, wherein the executable graph-based model comprises a first plane and a second plane such that the first plane comprises the plurality of index nodes and the second plane comprises the plurality of node templates and the plurality of node instances.

20. A method, comprising:
receiving, by processing circuitry of an overlay system, a first stimulus associated with the overlay system,
wherein an executable graph-based model, that comprises a plurality of index nodes, a plurality of node templates, and a plurality of node instances, is stored in a storage element of the overlay system,
wherein each index node, each node template, and each node instance corresponds to a node in the executable graph-based model,
wherein each node template, of the plurality of node templates, is associated with (i) a set of node instances of the plurality of node instances and (ii) a set of index nodes of the plurality of index nodes, such that each index node, of the set of index nodes, is associated with the set of node instances,
wherein the executable graph-based model is indicative of the association between each node template and a corresponding set of node instances and a corresponding set of index nodes,
wherein each node template corresponds to a predefined node structure, whereas the associated set of node instances corresponds to a set of implementations of the corresponding node template,
wherein each index node of the set of index nodes comprises a set of index records associated with the set of node instances, with each index comprising an identifier of the corresponding node instance and an index value derived from one or more node instance values of the corresponding node instance, and
wherein a first context of the first stimulus is indicative of at least a reference index value;
identifying, by the processing circuitry, in the executable graph-based model, based on the first context of the first stimulus, one or more index records that include the reference index value;
identifying, by the processing circuitry, from the plurality of node instances, one or more node instances having one or more identifiers associated with the identified one or more index records, respectively; and
executing, by the processing circuitry, an operation associated with the first stimulus based on the one or more node instances and each node template associated with the one or more node instances.

* * * * *